(12) United States Patent
Christie et al.

(10) Patent No.: US 6,667,982 B2
(45) Date of Patent: *Dec. 23, 2003

(54) BROADBAND TELECOMMUNICATIONS SYSTEM INTERFACE

(75) Inventors: Joseph Michael Christie, deceased, late of Mt. Pleasant, PA (US), Jean M. Christie, Joseph S. Christie, legal representatives; Michael Joseph Gardner, Overland Park, KS (US); Tracy Lee Nelson, Shawnee Mission, KS (US); William Lyle Wiley, Olathe, KS (US); Albert Daniel DuRee, Independence, MO (US)

(73) Assignee: Sprint Communications Company, L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/237,759

(22) Filed: Sep. 9, 2002

(65) Prior Publication Data

US 2003/0007492 A1 Jan. 9, 2003

(Under 37 CFR 1.47)

Related U.S. Application Data

(63) Continuation of application No. 09/800,698, filed on Mar. 7, 2001, now Pat. No. 6,470,009, which is a continuation of application No. 09/413,734, filed on Oct. 6, 1999, now Pat. No. 6,304,580, which is a continuation of application No. 08/755,438, filed on Nov. 22, 1996, now Pat. No. 6,023,474.

(51) Int. Cl.[7] .......................... H04L 12/28; H04L 12/56
(52) U.S. Cl. ...................................... 370/410; 370/467
(58) Field of Search ............................. 370/351–356, 370/391.1, 396, 389, 397, 398, 399, 395.2, 400, 401, 410, 426, 465, 466, 467

(56) References Cited

U.S. PATENT DOCUMENTS

| | | | | |
|---|---|---|---|---|
| 5,483,527 A | * | 1/1996 | Doshi et al. | 370/399 |
| 5,509,010 A | * | 4/1996 | La Porta et al. | 370/397 |
| 5,568,475 A | * | 10/1996 | Doshi et al. | 370/399 |

\* cited by examiner

*Primary Examiner*—Ajit Patel

(57) ABSTRACT

The invention is a system for interfacing a GR-303 system with a broadband system. The broadband system can be an ATM system. The invention can process the GR-303 signaling to select ATM connections and then interwork the GR-303 connections with the selected ATM connections. The invention can interwork GR-303 signaling and SS7 signaling. The invention can also process SS7 signaling to select GR-303 connections and then interwork ATM connections with the selected GR-303 connections.

20 Claims, 18 Drawing Sheets

FIG. 16

| ASSOCIATED POINTCODE | CIC | VP | VC | TRUNK GROUP NUMBER | GROUP MEMBER NUMBER | HARDWARE IDENTIFIER | ECHO CANCELER | ECHO CONTROL | SATELLITE INDICATOR | CIRCUIT STATUS | CIRCUIT STATE | TIME/ DATE |
|---|---|---|---|---|---|---|---|---|---|---|---|---|
| | | | | | | | | | | | | |
| | | | | | | | | | | | | |
| | | | | | | | | | | | | |

FIG. 17

| TRUNK GROUP NUMBER | GLARE RESOLUTION | CONTINUITY CONTROL | CLLI | SATELLITE TRUNK GROUP | SERVICE INDICATOR | ASSOCIATED NPA | SELECTION SEQUENCE | HOF COUNTER | ACC ACTIVE | OMI | NEXT FUNCTION | INDEX |
|---|---|---|---|---|---|---|---|---|---|---|---|---|
| | | | | | | | | | | | | |
| | | | | | | | | | | | | |
| | | | | | | | | | | | | |

FIG. 18

| EXCEPTION TABLE INDEX | CARRIER SELECTION IDENTIFICATION | CARRIER IDENTIFICATION | NATURE OF ADDRESS | CALLEDPARTY | | NEXT FUNCTION | INDEX |
|---|---|---|---|---|---|---|---|
| | | | | DIGITS FROM | DIGITS TO | | |
| | | | | | | | |
| | | | | | | | |
| | | | | | | | |

FIG. 19

| ANI TABLE INDEX | CALLING PARTY CATEGORY | NATURE OF ADDRESS | CALLINGPARTY/CHARGENUMBER ||| ORIGINATING LINE INFORMATION | NEXT FUNCTION | NEXT INDEX |
|---|---|---|---|---|---|---|---|---|
| | | | DIGITS FROM | DIGITS TO | DATA | | | |
| | | | | | | | | |
| | | | | | | | | |

FIG. 20

| CALLEDNUMBER TABLEINDEX | NATUREOFADDRESS | DIGITS FROM | DIGITS TO | NEXT FUNCTION | NEXT INDEX |
|---|---|---|---|---|---|
| | | | | | |
| | | | | | |

FIG. 21

| ROUTING TABLE INDEX | TRANSITNETWORKSELECTION ||| CIRCUIT CODE | NEXT FUNCTION #1 | INDEX #1 | NEXT FUNCTION #2 | INDEX #2 | NEXT FUNCTION #3 | INDEX #3 |
|---|---|---|---|---|---|---|---|---|---|---|
| | NETWORK IDENTIFICATION PLAN | DIGITS FROM | DIGITS TO | | | | | | | |
| | | | | | | | | | | |
| | | | | | | | | | | |

FIG. 22

| INDEX | MESSAGERECEIVED CAUSEVALUE | GENERALLOCATION | CODING STANDARD | CAUSEVALUE | NEXT FUNCTION | INDEX |
|---|---|---|---|---|---|---|
| | | | | | | |
| | | | | | | |

| MESSAGETYPE | PARAMETERS | INDEX #1 | INDEX #... | INDEX #N |
|---|---|---|---|---|
| ADDRESSCOMPLETE | BACKWARDCALLINDICATOR | | | |
| | ACCESSTRANSPORT | | | |
| | CAUSEINDICATOR | | | |
| | OPTIONALBACKWARDCALL INDICATORS | | | |
| | OPTIONAL"FE"INDICATOR | | | |
| ANSWER | ACCESSTRANSPORT | | | |
| | BACKWARDCALLINDICATOR | | | |
| CALLPROGRESS | EVENTINFORMATION | | | |
| | BACKWARDCALLINDICATOR | | | |
| | ACCESSTRANSPORT | | | |
| | CAUSEINDICATOR | | | |
| | OPTIONALBACKWARDCALLINDICATOR | | | |
| CIRCUITRESERVATION | NATUREOFCONNECTIONINDICATOR | | | |
| CIRCUITRESERVATIONACK | N/A | | | |
| CONFUSION | N/A | | | |
| CONTINUITY | CONTINUITYINDICATOR | | | |
| EXIT | OUTGOINGTRUNKGROUPNUMBER | | | |
| INFORMATION | ALLPARAMETERS | | | |
| INFORMATIONREQUEST | ALLPARAMETERS | | | |
| INITIALADDRESS | NATUREOFCONNECTIONINDICATOR | | | |
| | FORWARDCALLINDICATOR | | | |
| | CALLINGPARTY'SCATEGORY | | | |
| | USERSERVICEINFORMATION | | | |
| | CALLEDPARTYNUMBER | | | |
| | ACCESSTRANSPORT | | | |
| | CALLINGPARTYNUMBER | | | |
| | CARRIERIDENTIFICATION | | | |
| | CARRIERSELECTIONINFORMATION | | | |
| | CHARGENUMBER | | | |
| | GENERICADDRESS | | | |
| | ORIGINATINGLINEINFORMATION | | | |
| | ORIGINALCALLEDNUMBER | | | |
| | REDIRECTINGNUMBER | | | |
| | SERVICECODE | | | |
| | TRANSITNETWORKSELECTION | | | |
| | HOPCOUNTER | | | |
| PASSALONG | ALLPARAMETERS | | | |
| RELEASE | CAUSEINDICATOR | | | |
| | ACCESSTRANSPORT | | | |
| | AUTOMATICCONGESTIONCONTROL | | | |
| RELEASECOMPLETE | N/A | | | |
| RESUME | SUSPEND/RESUMEINDICATOR | | | |
| SUSPEND | SUSPEND/RESUMEINDICATOR | | | |

*FIG. 23*

BROADBAND TELECOMMUNICATIONS SYSTEM INTERFACE

RELATED APPLICATIONS

This application is a continuation of U.S. patent application Ser. No. 09/800,698 filed Mar. 7, 2001 now U.S. Pat. No. 6,470,009, which is a continuation of 09/413,734 filed on Oct. 6, 1999 now U.S. Pat. No. 6,304,580, which is a continuation of 08/755,438 filed on Nov. 22, 1996 now U.S. Pat. No. 6,023,474, and which are all incorporated by reference into this application.

FEDERALLY SPONSERED RESEARCH OR DEVELOPMENT

Not applicable

MICROFICHE APPENDIX

Not applicable

BACKGROUND OF THE INVENTION

1. Field of the Invention

The invention relates to telecommunications, and in particular, to systems that provide access between GR-303 systems and broadband systems.

2. Background of the Prior Art

FIG. 1 depicts a common prior art arrangement for local telecommunications access. Shown are telephones that are connected to a local switch through remote digital terminals. Typically, there are several more telephones connected to each remote digital terminal, but the number depicted has been restricted for purposes of clarity. The connections between the telephones and the remote digital terminals typically carry analog signals over twisted pair wires, but other connections are also known. The remote digital terminals provide a digital interface between the callers and the local switch by converting the analog signals from the callers into a multiplexed digital signal for the local switch. A common standard for the connection between the remote digital terminal and the local switch is provided in Bellcore Reference GR-TSY-000303 (GR-303). The GR-303 format is very similar to the Integrated Services Digital Network (ISDN) format. ISDN has bearer channels (B) and a signaling channel (D) that are typically combined at the primary rate (23B+D) or at the basic rate (2B+D). Both the ISDN format and the GR-303 format are well known.

At present, broadband systems are being developed and implemented. Broadband systems provide telecommunications service providers with many benefits, including higher capacities, more efficient use of bandwidth, and the ability to integrate voice, data, and video communications. These broadband systems provide callers with increased capabilities at lower costs. However, callers may not have broadband terminals that can access these broadband systems. These callers need an effective interface that provides them with access to sophisticated broadband systems without the need for their own broadband terminals. Telecommunications service providers also need such an interface in order to use their broadband systems to provide services to a larger base of users.

SUMMARY OF THE INVENTION

The invention includes a telecommunications system that interworks between a broadband system, such as an Asynchronous Transfer Mode (ATM) system, and a GR-303 system for telecommunications calls. The telecommunications system comprises a signaling processing system, a signaling interface, and a bearer interface. The signaling processing system is operational to process call signaling from the GR-303 system and from the ATM system, to select at least one of a GR-303 connection and an ATM connection for each call, and to provide control messages that identify the selected connections. The signaling interface that is operational to exchange the call signaling between the GR-303 system and the signaling processing system. The bearer interface that is operational to receive the control messages from the signaling processing system and to interwork call communications between the GR-303 system and the ATM system on the selected connections based on the control messages.

In some embodiments the signaling processing system is also operational to interwork the signaling from the GR-303 system and Signaling System #7 (SS7) signaling. Other embodiments include a remote digital terminal, an ATM cross-connect, an ATM multiplexer, a signaling converter, or a signaling processor.

The invention also includes a method for operating a telecommunications system that interworks between a GR-303 system and an Asynchronous Transfer Mode (ATM) system for telecommunications calls. The method comprises receiving GR-303 signaling and GR-303 communications into the telecommunications system. The GR-303 signaling is converted into Signaling System #7 (SS7) signaling, which is processed to select ATM connections. The GR-303 connections are interworked with the selected ATM connections.

In some embodiments, the method also includes receiving SS7 signaling and ATM communications into the telecommunications system. The SS7 signaling is processed to select GR-303 connections, and the ATM communications are interworked with the selected GR-303 connections. In some embodiments, the method also includes receiving additional GR-303 signaling and additional GR-303 communications into the telecommunications system. The additional GR-303 signaling is converted into additional Signaling System #7 (SS7) signaling which is processed to select GR-303 connections. The additional GR-303 communications are interconnected with the selected GR-303 connections.

The invention provides callers with an effective interface to sophisticated broadband systems without the need for their own broadband terminals. The invention provides telecommunications service providers with an interface that can use broadband systems to provide services to a large base of users.

BRIEF DESCRIPTION OF THE DRAWINGS

FIG. 16 depicts an example of the trunk circuit table.

FIG. 17 depicts an example of the trunk group table.

FIG. 18 depicts an example of the exception table.

FIG. 19 depicts an example of the ANI table.

FIG. 20 depicts an example of the called number table.

FIG. 21 depicts an example of the routing table.

FIG. 22 depicts an example of the treatment table.

FIG. 23 depicts an example of the message table.

DETAILED DESCRIPTION

Figure 1:
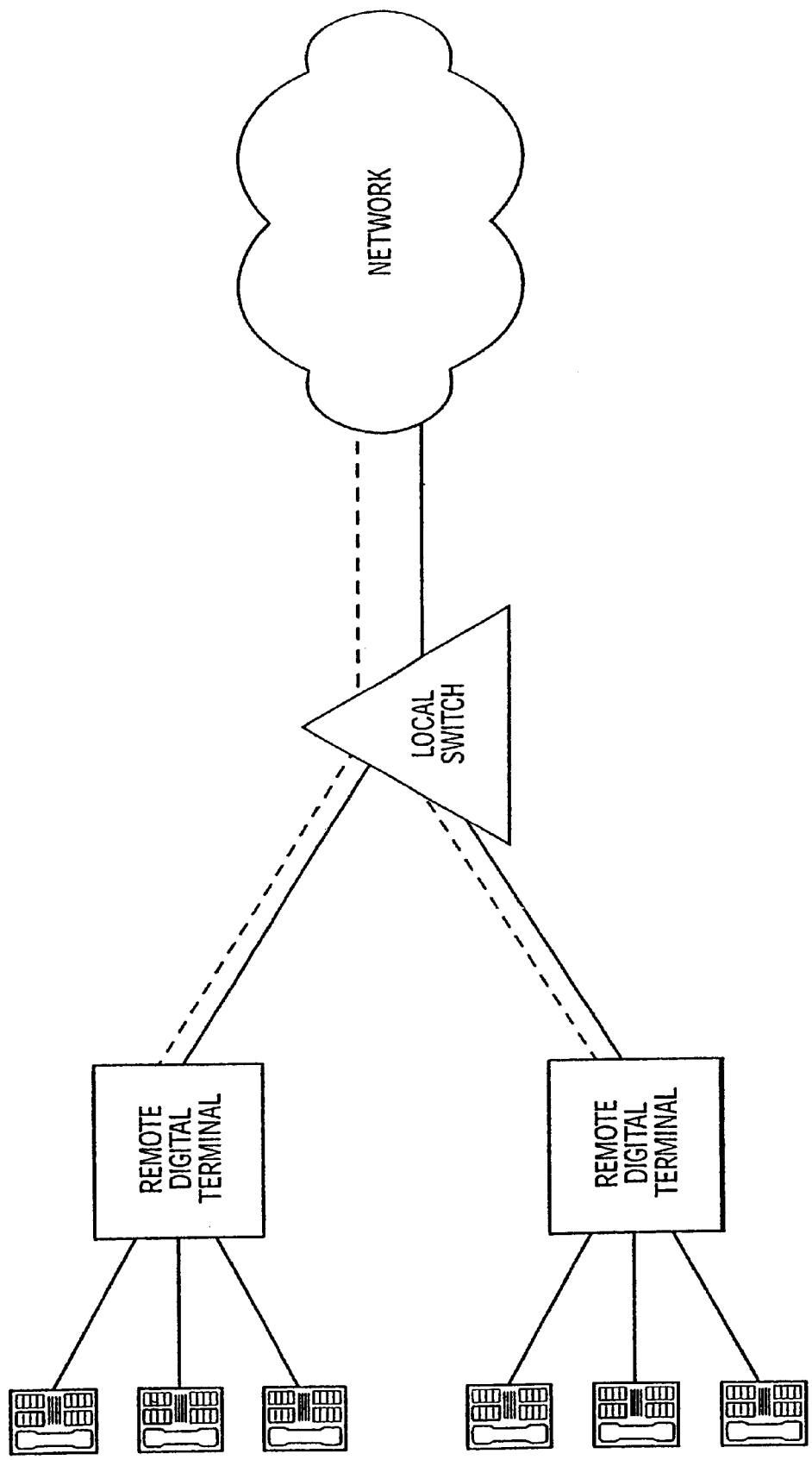
FIG. 1 is a block diagram of a version of the prior art.

FIG. 1 depicts the prior art arrangement discussed above for providing access to a telecommunications system. In this arrangement, telephones are connected over analog connections to remote digital terminals. The remote digital terminals convert the analog signals into a multiplexed digital signal that is based on the GR-303 standard. The local switch accepts the GR-303 formatted signal and provides the callers with telephone service. All of these components and connections are well known in the art.

Figure 2:
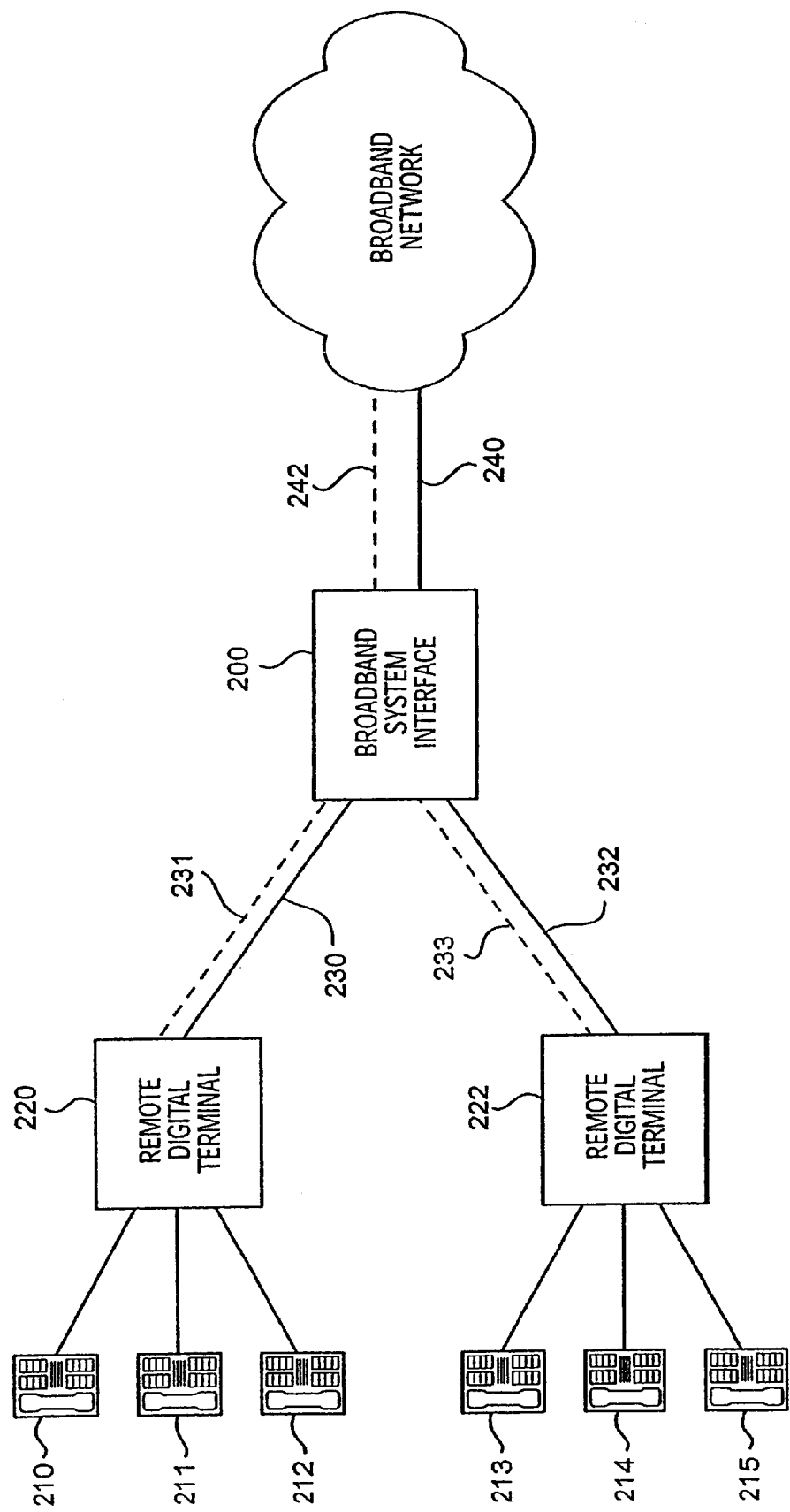
FIG. 2 is a block diagram of a version of the present invention.

FIG. 2 depicts a version of the invention. Telephones 210–215 are shown connected to remote digital terminals 220 and 222. These telephones and remote digital terminals are connected and function as discussed above with respect to FIG. 1. It should be noted that although only telephones are shown, the invention is fully applicable to numerous other types of communications devices seeking access to a broadband system. Examples would include wireless devices, computers, modems, and facsimile machines. These devices may employ many forms of connections to remote digital terminals 220 and 222, for example, wireless and co-axial connections. Also shown on FIG. 2 is broadband system interface 200. Broadband system interface 200 replaces the local switch of FIG. 1. Broadband system interface 200 is connected to remote digital terminal 220 by connection 230 and link 231. Broadband system interface 200 is connected to remote digital terminal 222 by connection 232 and link 233. Connections 230 and 232 are based on the GR-303 format and represent the bearer channels. Links 231 and 233 are based on the GR-303 format and represent the signaling channels. Also shown are connection 240 and signaling link 242. Connection 240 is a broadband connection, for example a Synchronous Optical Network (SONET) connection carrying Asynchronous Transfer Mode (ATM) cells. Other forms of broadband connections are also applicable. Signaling link 242 carries telecommunications signaling, for example Signaling System #7 (SS7) messages. Other forms of signaling links are also applicable. Connection 240 and link 242 are connected to a broadband network cloud that represents any number of network elements such as switches, enhanced platforms, and servers to name some examples.

The operation of broadband system 200 includes the conversion of bearer communications and signaling from one format into another. Bearer communications are the user information, for example, voice traffic. Signaling is information used by the network, for example, a called number. In some embodiments the conversion process is described with the term "interworking". This term is well known to those in the art. For example, GR-303 signaling is interworked with SS7 signaling by converting GR-303 signaling into analogous SS7 signaling and by converting SS7 signaling into analogous GR-303 signaling. GR-303 bearer communications are interworked with ATM communications by converting GR-303 bearer communications into analogous ATM communications and by converting ATM communications into analogous GR-303 communications.

Broadband system interface 200 accepts calls in the GR-303 format from connection 230 and link 231 and from connection 232 and link 233. Broadband system interface 200 provides a bearer interface for the GR-303 bearer channels and a signaling interface for the GR-303 signaling channels. The signaling interface provides the GR-303 signaling to a signaling processing system in broadband system interface 200. The signaling processing system processes the call signaling and selects connections for the calls. The bearer interface receives communications from the GR-303 bearer channels and implements the selected connections in response to instructions from the signaling processing system. Typically, this requires interworking between GR-303 connections and broadband connections, and the connections can be selected on a call-by-call basis. Broadband system interface 200 may route calls to one of the other telephones connected to remote digital terminals 220 or 222. In addition, broadband interface system 200 may route calls over broadband connection 240 and associated signaling over link 242. Connection 240 and link 242 could connect callers to many other networks and network elements that provide numerous services.

It can be seen that broadband system interface 200 provides callers with access to a broadband system. In can also be seen that broadband system 200 is capable of accepting calls in the standard GR-303 format currently used by local switches.

Figure 3:
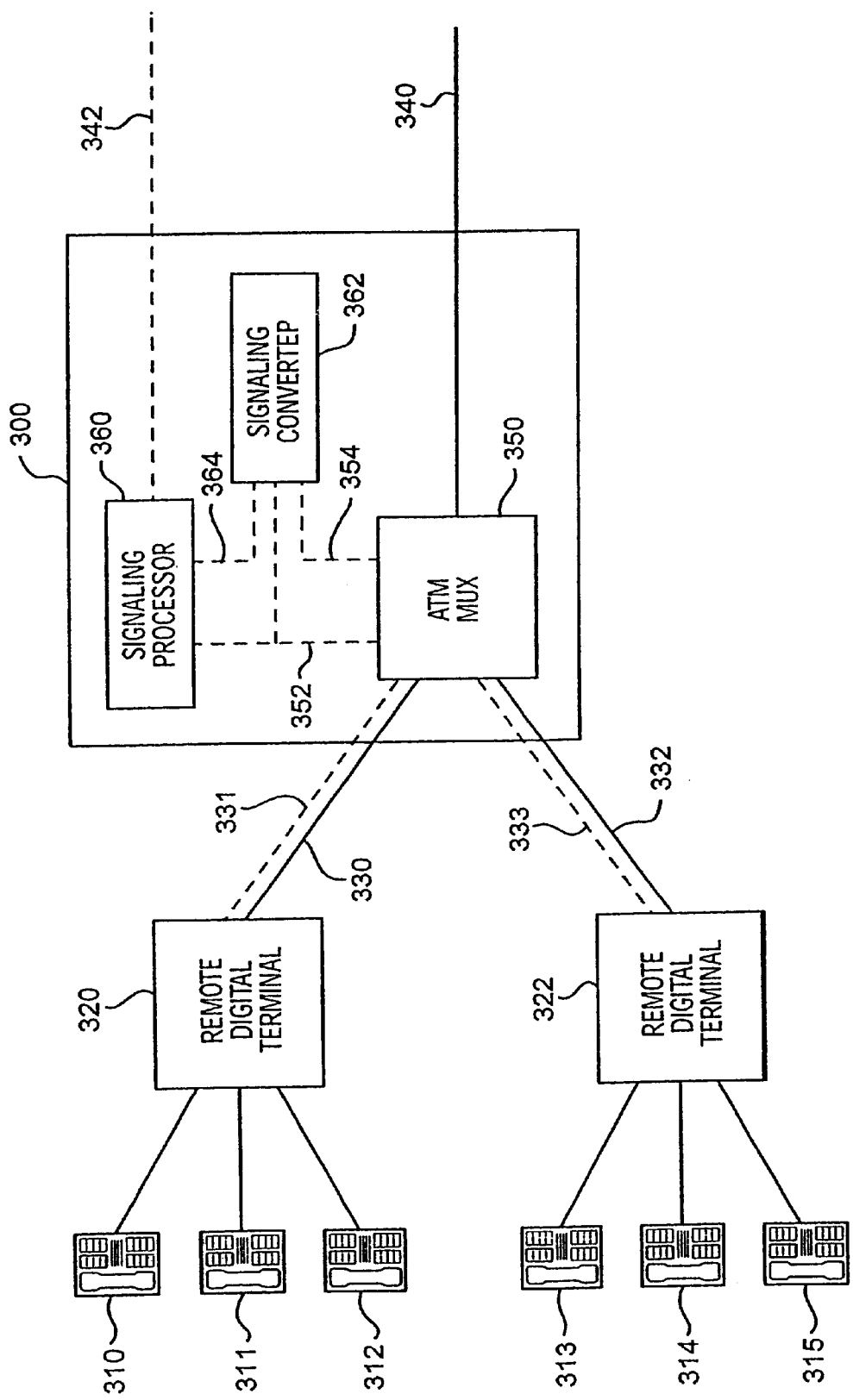
FIG. 3 is a block diagram of a version of the present invention.

FIG. 3 depicts a version of the invention, although one skilled in the art will recognize variations from this version that are also contemplated for the invention. Shown are telephones 310–315, remote digital terminals 320 and 322, and broadband system interface 300. Broadband system interface 300 is comprised of ATM interworking multiplexer (mux) 350, signaling processor 360, and signaling converter 362. Remote digital terminal 320 is connected to mux 350 by connection 330 and link 331. Remote digital terminal 322 is connected to mux 350 by connection 332 and link 333. Mux 350, signaling processor 360, and converter 362 are linked by link 352. Mux 350 is linked to signaling converter 362 by link 354. Signaling converter 362 is linked to signaling processor by link 364. Mux 350 is also connected to connection 340 and signaling processor 360 is also linked to link 342.

Telephones 310–315, remote digital terminals 320 and 322, connections 330 and 332, and links 331 and 333 are as described above. Connections 320 and 322 and links 331 and 333 comprise GR-303 multiplexed digital signals. The GR-303 multiplexed digital signal is comprised of multiple bearer channels that carry caller communications and a signaling channel that carries caller signaling. Link 352 could be any link capable of transporting control messages. Examples of such a link could be SS7 links, UDP/IP or TCP/IP over ethernet, or a bus arrangement using a conventional bus protocol. Link 354 carries DS0s that comprise GR-303 signaling channels. Links 342 and 364 are SS7 links. Connection 340 is an ATM connection.

Mux 350 provides the bearer interface and the signaling interface. Mux 350 is operational to receive GR-303 formatted communications over connections 330 and 332 and links 331 and 333. The bearer channels from connections 330 and 332 and the signaling channels from links 331 and 333 are in the well known DS0 format. Mux 350 is able to connect each DS0 to any other DS0. Mux 350 connects the DS0 from link 331 to a DS0 of link 354 to provide a GR-303 signaling channel from remote digital terminal 320 to signaling converter 362. Mux 350 connects the DS0 from link 333 to a DS0 of link 354 to provide a GR-303 signaling channel from remote digital terminal 322 to signaling converter 362. Mux 350 can also connect DS0s that carry user communications. For example, a DS0 from telephone 310 could be connected to a DS0 for telephone 314. Mux 350 can make this latter DS0 to DS0 connection in response to control instructions from signaling processor 360 that are received over link 352.

Mux 350 is also operational to convert DS0s into ATM cells with selected Virtual Path Identifiers/Virtual Channel Identifiers (VPI/VCIs). This conversion is known as ATM interworking. These ATM cells are transmitted over connection 340. Typically, they are provided to an ATM cross-connect device that routes the cells according to their VPI/VCI. Since DS0s are bi-directional, a companion VPI/VCI will typically be pre-assigned to the selected VPI/VCI to provide a call connection back to the caller. The mux would convert ATM cells from this companion VPI/VCI into the return path of the DS0. Mux 350 makes the DS0/ATM conversions in response to control instructions from signaling processor 360 that are received over link 352.

In this embodiment, mux 350 also includes digital signal processing capability that can detect and provide tones for particular DS0s. For example, Mux 350 could apply dial tone to a particular DS0 in response to a control instruction from signaling converter 362. Mux 350 could then detect the DTMF inputs received from the caller over the DS0 and provide this information to signaling converter 362 over link 352. A detailed description of the mux is given below.

Signaling processor 360 and signaling converter 362 comprise a signaling processing system that is operational to receive GR-303 signaling and select connections. It can also receive SS7 signaling and select connections. These two components can be integrated or remain discreet.

Signaling converter 362 interworks between GR-303 signaling and SS7 signaling. Signaling converter 362 exchanges GR-303 signaling with remote terminal devices 320 and 322 over links 354, 331, and 333 (and through mux 350). Signaling converter 362 exchanges SS7 signaling with signaling processor 360 over link 364. GR-303 relies on the LAPD and Q.931 protocols established for ISDN D channel signaling. Devices that convert ISDN D channel signaling onto the SS7 format are known. One skilled in the art will appreciate how such a device could be adapted to convert GR-303 signaling into the SS7 format.

In some embodiments, signaling converter 362 will generate and transmit control instructions to mux 350 over link 354 to collect DTMF input from a caller. This will typically occur in response to a GR-303 set-up message. After these digits are collected by mux 350, signaling converter 362 will receive a message from mux 350 over link 352 that identifies the digits dialed by the caller. These digits will be incorporated into an SS7 message sent to signaling processor 360. Signaling converter 362 may also instruct mux 350 to provide ringback to caller at the far end of the call. The mux would provide a ringback to the caller at the far end that indicates the called party at the near end was being alerted. Where appropriate, a busy signal may be provided. Signaling converter 262 may also instruct the mux to provide the callers number to the called party. This could be used for the caller ID feature.

Signaling processor 360 is operational to process signaling. The signaling processor will typically process an SS7 Initial Address Message (IAM) for call set-up. The signaling information is processed by signaling processor 360 in order to select a particular connection for a particular call. This connection might be a DS0 or a VPI/VCI. Signaling processor 360 sends control instructions to mux 350 identifying the selected connections. A detailed description of the signaling processor follows below.

Figure 4:
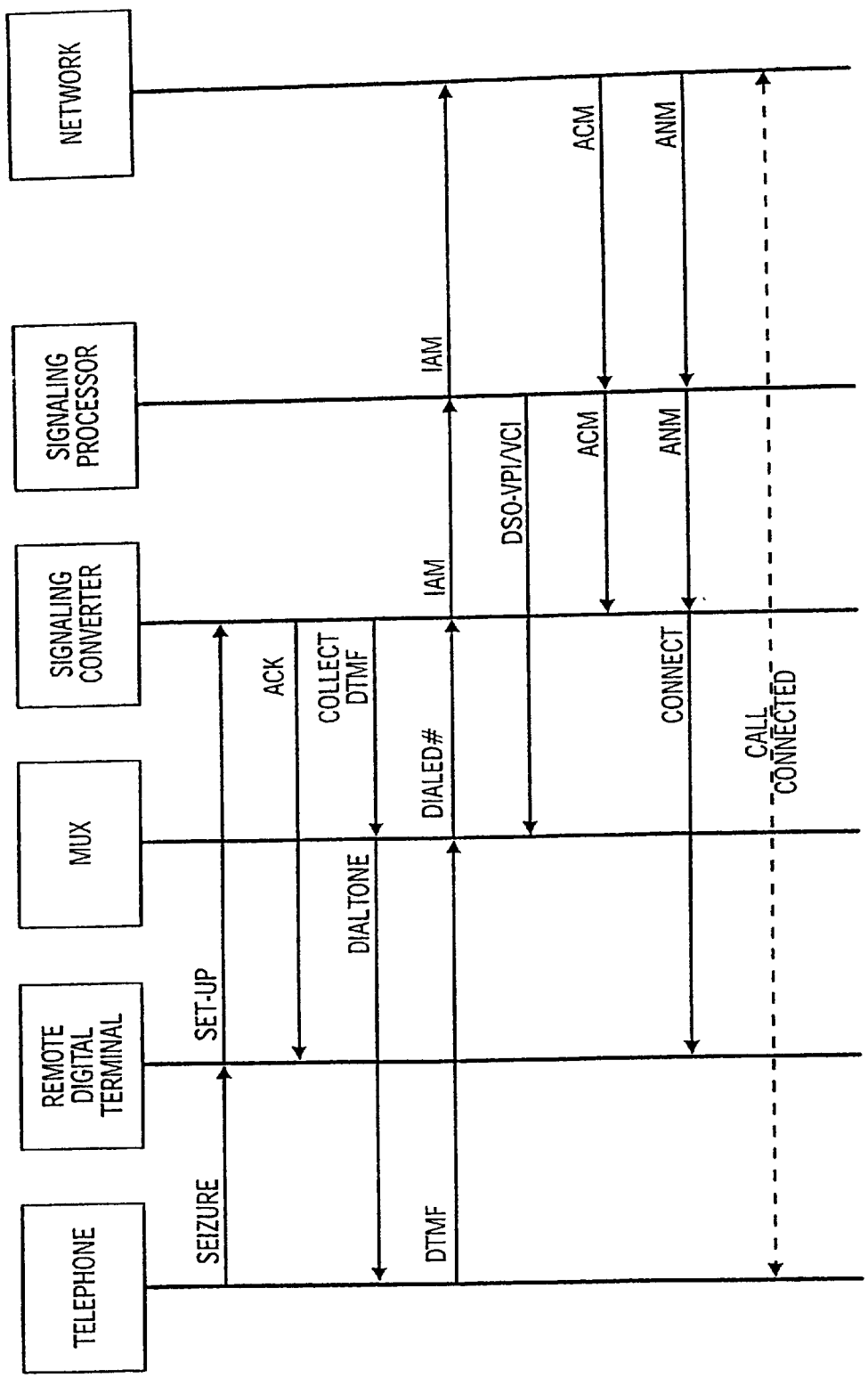
FIG. 4 is a message sequence chart for a version of the present invention.

FIG. 4 depicts the operation of the invention in the form of a message sequence chart. FIG. 4 depicts a call being placed from a telephone (for example, telephone 310 in FIG. 3) to an entity across the country. The sequence starts with the telephone seizing a connection to the remote digital terminal. This could be done by the telephone going off-hook. The remote digital terminal senses the off-hook condition and sends a GR-303 set-up message to the signaling converter through the mux. (As the mux transfers all messages between the signaling converter and the remote digital terminal, express reference to this transfer will be omitted in the following discussions). The set-up message identifies the DS0 used by the remote digital terminal for the call. The signaling converter provides a set-up acknowledgment back to the remote digital terminal and instructs the mux to collect DTMF from the DS0 for the call. The mux provides dial tone to the selected DS0 and internally connects the DS0 to digit collection apparatus. (On ground start circuits at this time, the remote digital terminal will send tip-ring voltage to the telephone and receive loop closure from the telephone—these are not shown). The telephone responds with the caller's DTMF input. The mux detects the DTMF input and provides a message to the signaling converter identifying the dialed number. The signaling converter converts the GR-303 set-up message into an analogous SS7 IAM containing the dialed number from the mux and sends the SS7 IAM to the signaling processor.

The signaling processor processes the SS7 IAM and selects a connection. For a cross-country call, this connection would typically be a VPI/VCI provisioned to a long distance network. The signaling processor will generate an SS7 IAM and send it on to the relevant network element to extend the call. The signaling processor also sends a control instruction to the mux identifying the DS0 and VPI/VCI.

Once the far end has received all information required for the call, it will return an SS7 Address Complete Message (ACM) to the signaling processor, which will pass another ACM to the signaling converter. At this time, the far end typically returns a ringback tone that indicates that the called party is being alerted (or a busy signal if appropriate). This ringback tone is passed to the telephone over the VPI/VCI—DS0 connection. If the called party answers, the signaling processor will receive an SS7 Answer Message (ANM) from the far end. The signaling processor will send an SS7 ANM message to the converter, and the converter will send an analogous GR-303 connect message to the remote digital terminal.

At this point, the call is connected and a conversation, fax transmission, etc., may take place. The mux converts caller information on the DS0 into ATM cells for the selected VPI/VCI. Additionally, the mux converts ATM cells received from the companion VPI/VCI into the return path of the DS0. As a result, the caller has access to an ATM system through the GR-303 interface. Advantageously, the VPI/VCI is selected on a call-by-call basis by the signaling processor. This allows the signaling processor to select a virtual connection that has been pre-provisioned to an appropriate destination.

Figure 5:
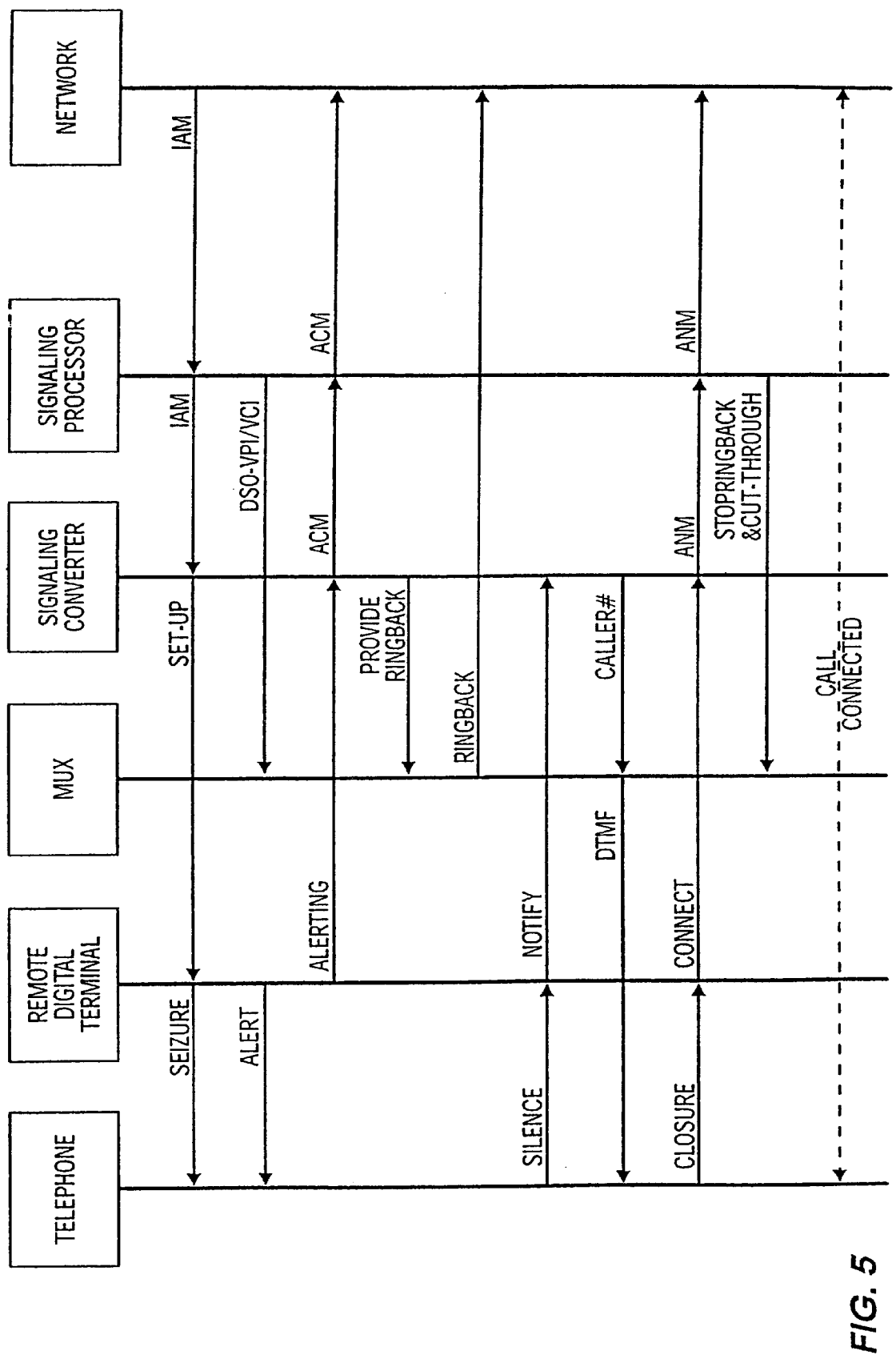
FIG. 5 is a message sequence chart for a version of the present invention.

FIG. 5 depicts a call from an entity across the country to the same telephone of FIG. 4. The sequence begins with an SS7 IAM from origination side of the call being received by the signaling processor. The signaling processor processes the IAM and selects the destination DS0. The signaling processor sends an IAM to the signaling converter which forwards an analogous GR-303 set-up message to the remote digital terminal. The set-up message identifies the selected DS0 to use on the call. The signaling processor also sends a control instruction to the mux identifying the VPI/VCI and the selected DS0 for the call.

The remote digital terminal provides seizure and an alerting signal to the telephone. The remote digital terminal will send a GR-303 alerting message to the signaling converter and the signaling converter will send an analogous SS7 Address Complete Message (ACM) to the signaling processor. The signaling converter will also instruct the mux to provide a ringback tone to the originating side of the call (or a busy signal where appropriate). The mux will provide a ringback to the caller indicating to the caller that the called party is being alerted. The signaling processor will send an SS7 ACM to the origination side of the call.

The remote digital terminal will sense a silent interval after the first ring and will send a GR-303 notify message to the signaling converter. Upon receipt, the signaling converter instruct the mux to pass the calling number to the telephone and the mux will pass the requisite DTMF tones to the telephone. When the remote digital terminal senses that the telephone has been answered, it will send a GR-303 connect message to the signaling converter, and the signaling converter will provide an analogous SS7 ANM to the signaling processor. The signaling processor will send an SS7 ANM to the originating side of the call. The signaling processor will instruct the mux to stop the ringback and provide cut-through for the call. At this point, the call is connected.

Figure 6:
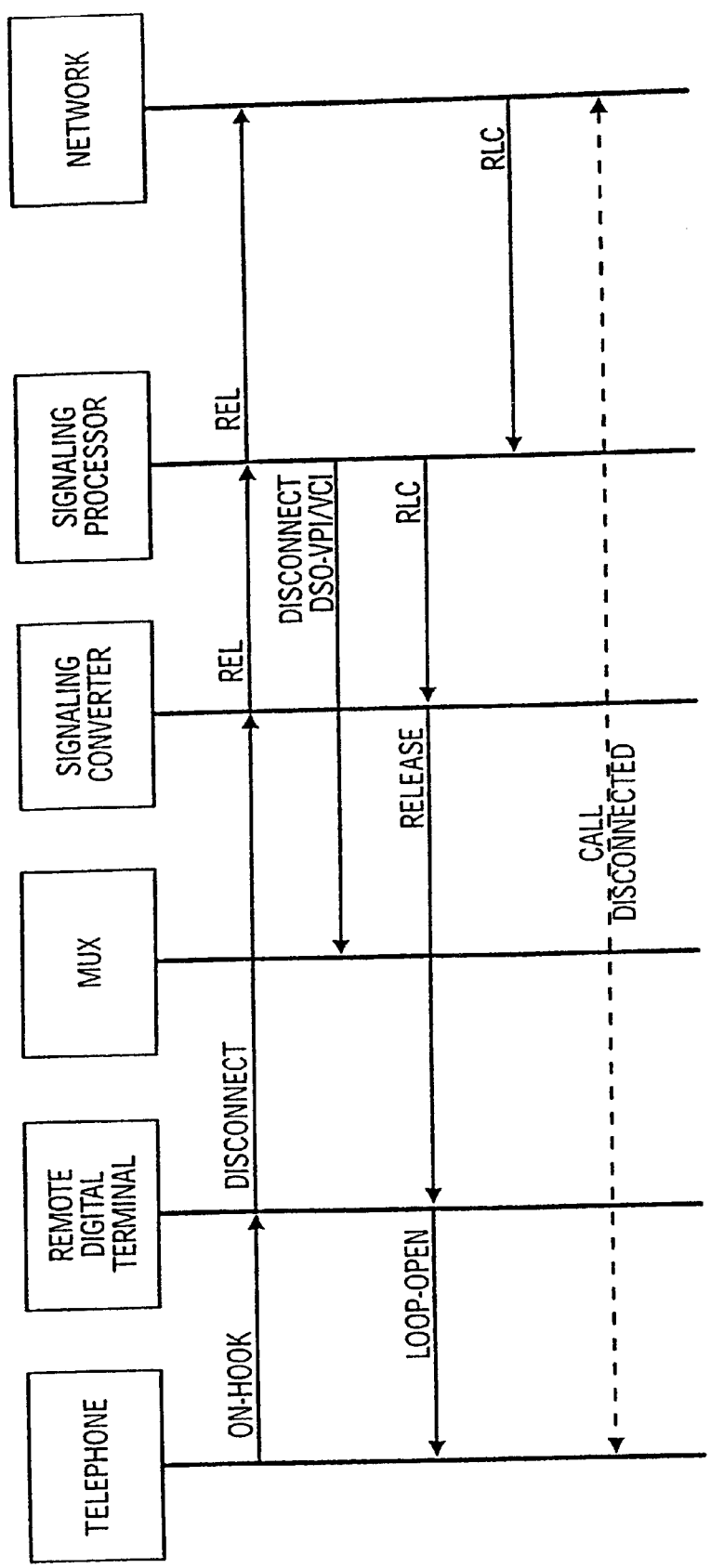
FIG. 6 is a message sequence chart for a version of the invention.

FIG. 6 depicts a call being cleared when the telephone of FIGS. 4 and 5 hangs-up. The remote digital terminal senses the on-hook and sends a GR-303 disconnect message to the signaling converter. The signaling converter sends an analogous SS7 release (REL) message to the signaling processor. The signaling processor sends an SS7 REL to the other side of the call connection and also sends the mux an instruction to disconnect the DS0 from the VPI/VCI. The signaling processor will then send an SS7 Release Complete Message (RLC) to the signaling converter, and the converter will send an analogous GR-303 release message to the remote digital converter. The remote digital converter will provide a loop open to the telephone. The far side of the call will typically respond with a SS7 Release Complete Message (RLC) to the signaling processor as well. At this point, the call is disconnected.

Figure 7:
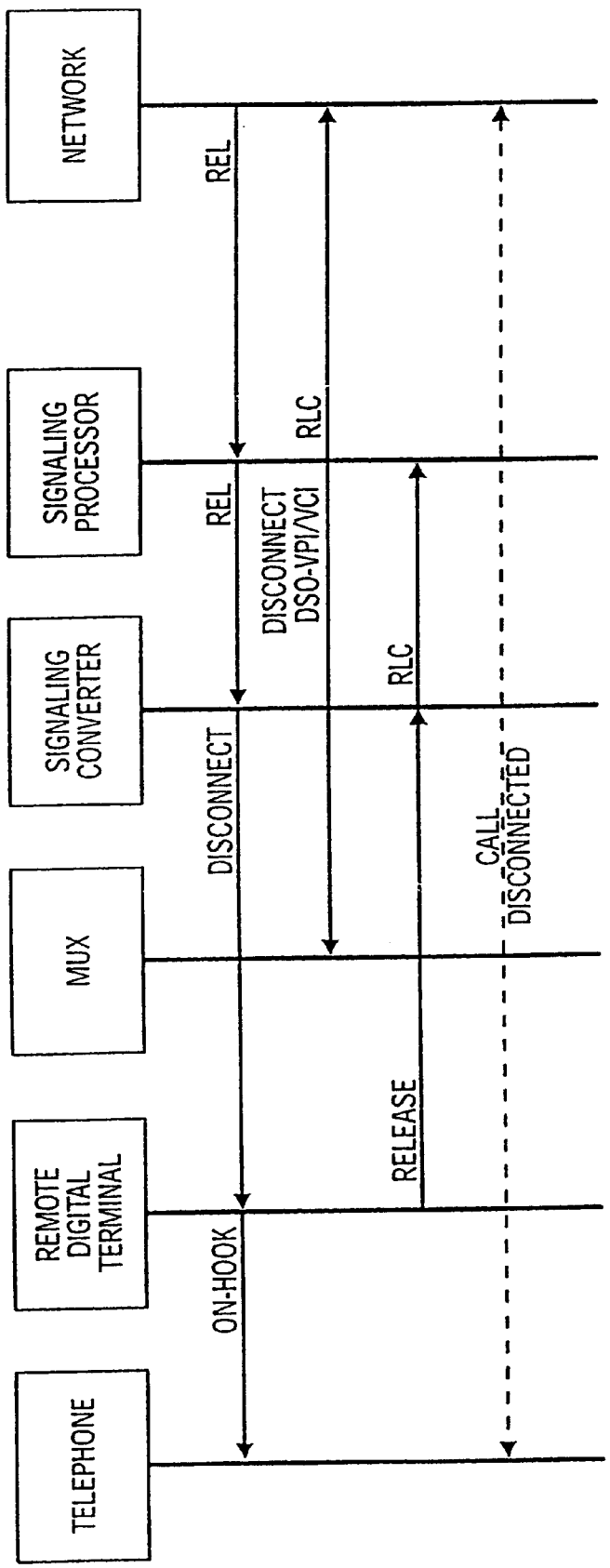
FIG. 7 is a message sequence chart for a version of the invention.

FIG. 7 depicts a call being cleared when the far end of the call hangs-up. The far end will send an SS7 REL to the signaling processor, and the signaling processor will initiate release procedures for the call. The signaling processor will send an SS7 REL to the signaling converter, and the signaling converter will send an analogous GR-303 disconnect message to the remote digital terminal. The remote digital terminal provides an on-hook to the telephone. The signaling processor will also provide a control instruction to the mux to disconnect the DS0 from the VPI/VCI, and will send an SS7 RLC to the other side of the call. When the remote digital terminal senses an on-hook from the telephone signaling processor, it will provide a GR-303 release message to the converter. The converter will provide an analogous SS7 RLC to the signaling processor indicating that the connection has been cleared for re-use. At this point, the call is disconnected.

In FIGS. 4–7, the caller is provided with an interface to a broadband system through a conventional GR-303 remote digital terminal. The network is able to provide this interface and provide selected ATM connection on a call-by-call basis—all without the need for an ATM switch or call-by-call control over an ATM cross-connect. Such a system provides a distinct advantage over prior systems.

The mux may implement DS0 to DS0 connections for particular calls. Referring to FIG. 3, if a call is placed from telephone 310 to telephone 314, a DS0 from telephone 310 and a DS0 to telephone 314 would be selected by signaling processor 360. Mux 350 would cross-connect the two DS0s in response to a command from signaling processor 360. Note that this occurs without converting the DS0s into ATM. In the alternative, the signaling processor may select a VPI/VCI for the call. The VPI/VCI would be pre-provisioned back to mux 350 for connection to the DS0 for telephone 314.

In some embodiments, particular telephones may be pulse dial instead of DTMF tone dial. The remote digital terminals are operational to detect the digits outpulsed by the telephones and to provide GR-303 information messages to the signaling converter (through the mux). The remote digital terminal can also receive an information message and outpulse the calling number to a called telephone. In these scenarios, the mux will not need to exchange DTMF with the telephones. The signaling converter exchanges GR-303 information messages with the remote digital interfaces. The signaling processor will exchange this information with the signaling converter through SS7 messages, and will not need to instruct the mux to exchange DTMF with the caller.

In an alternative embodiment, the remote digital interface could be adapted to exchange DTMF digits and provide dial tone to the telephones. In this embodiment, the mux would not need to handle DTMF or dial tone. GR-303 set-up and information messages could be used to convey dialed numbers between the remote digital interface and the converter.

In some embodiments, the remote digital interface may use hybrid GR-303 signaling. Hybrid GR-303 signaling employs robbed-bit ABCD signaling for on-hook/off-hook status in addition to a channel for additional signaling. In these embodiments, the mux would be adapted to forward the signaling from the signaling channel and the ABCD robbed signaling bits to the converter. The converter would be adapted to convert both into analogous SS7 messages.

FIGS. 8–12 depict various alternative arrangements of the invention, but the invention is not limited to these alternatives. Those skilled in the art will appreciate how these variations could be combined in many other different arrangements that are all contemplated by the invention.

Figure 8:
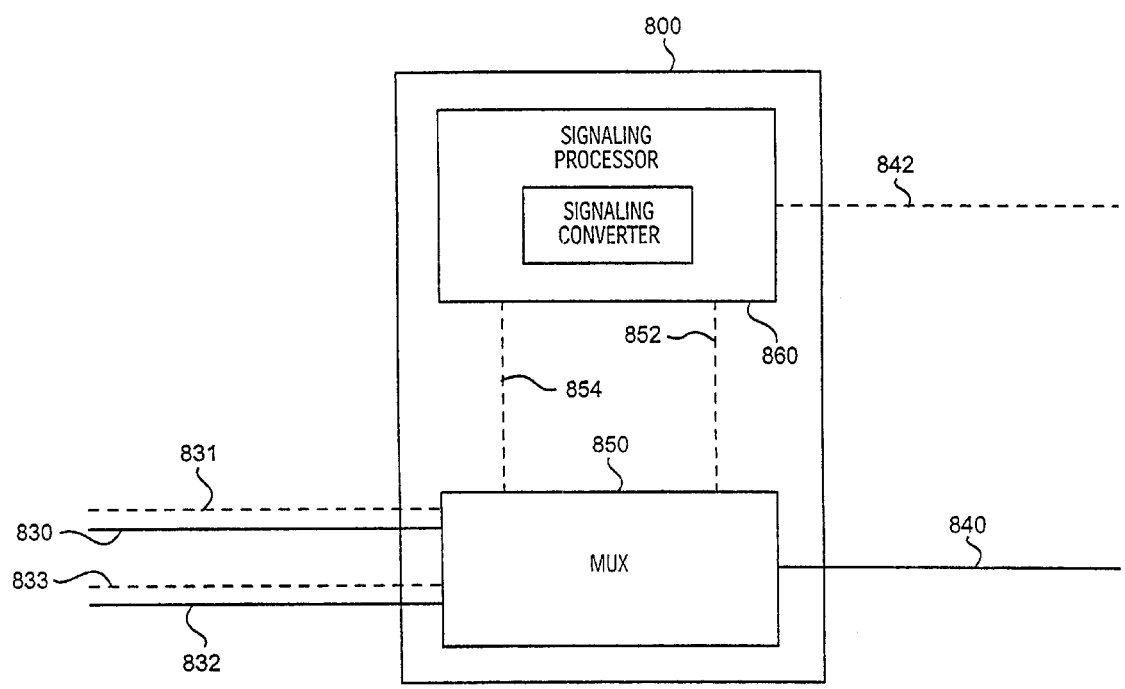
FIG. 8 is a block diagram of a version of the invention.

FIG. 8 depicts broadband system interface 800 that is comprised of mux 850, signaling processor 860 and links 852 and 854. Also shown are connections 830, 832, and 840; and links 831, 833, and 842. These components are configured and operate as described above for the corresponding reference numbers of FIG. 3, except that the signaling converter has been incorporated into signaling processor 860.

Figure 9:
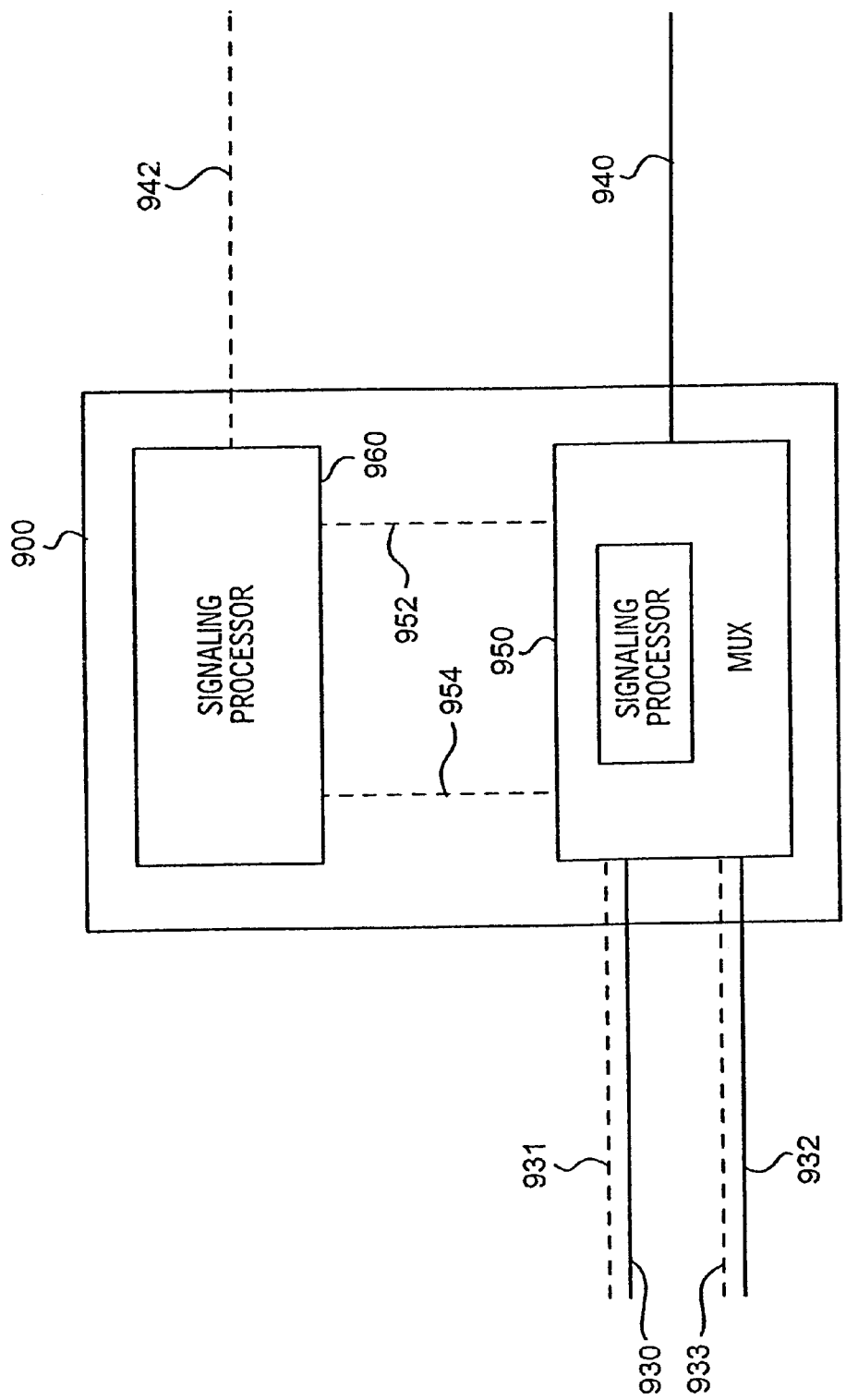
FIG. 9 is a block diagram of a version of the invention.

FIG. 9 depicts broadband system interface 900 that is comprised of mux 950, signaling processor 960 and links 952 and 954. Also shown are connections 930, 932, and 940; and links 931, 933, and 942. These components are configured and operate as described above for the corresponding reference numbers of FIG. 3, except that the signaling converter has been incorporated into mux 950.

Figure 10:
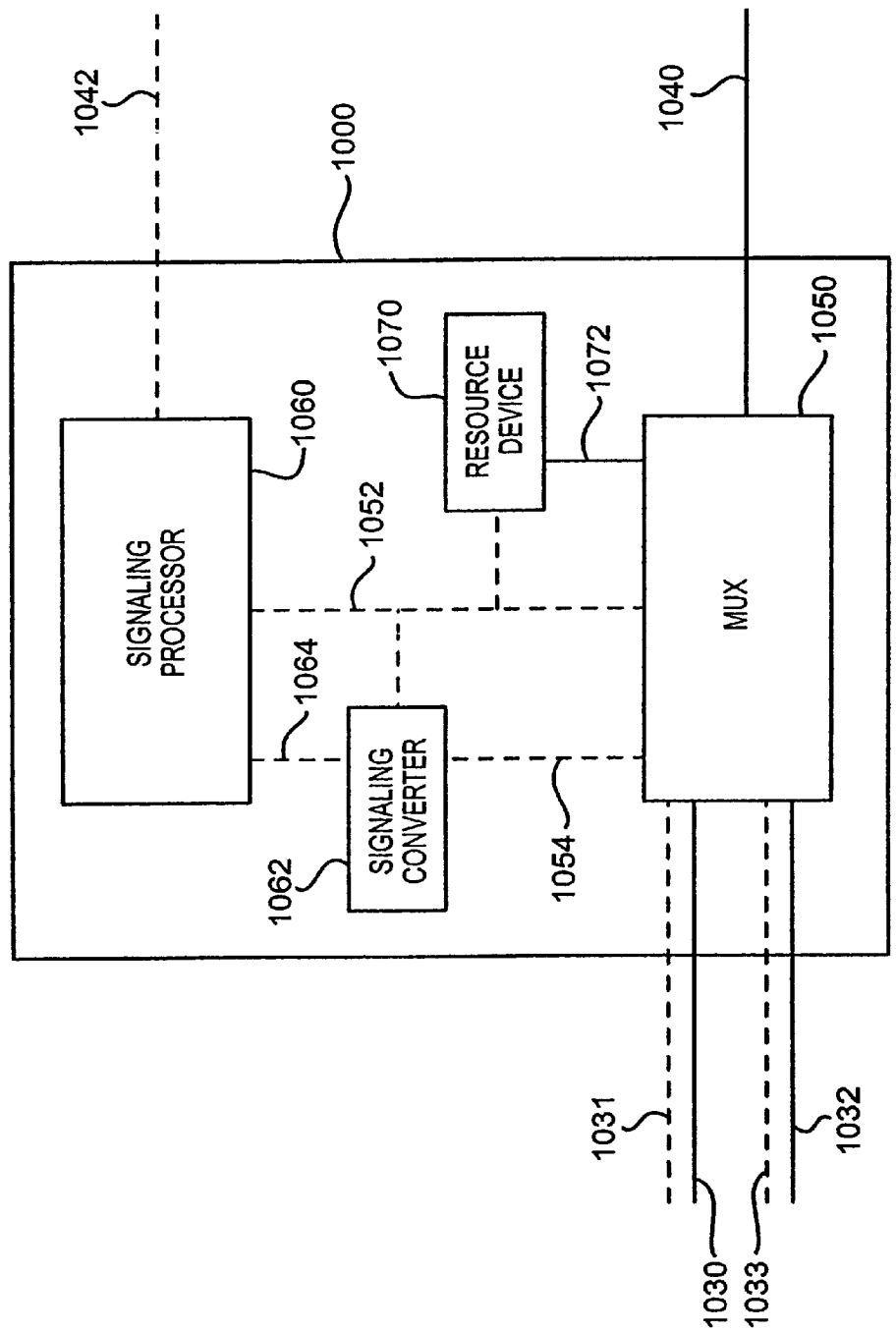
FIG. 10 is a block diagram of a version of the invention.

FIG. 10 depicts broadband system interface 1000 that is comprised of mux 1050, signaling processor 1060, signaling converter 1062, and links 1052, 1054, and 1062. Also shown are connections 1030, 1032, and 1040; and links 1031, 1033, and 1042. These components are configured and operate as described above except that resource device 1070 and connection 1072 have been added. Resource device 1070 is capable of providing various resources in response to control instructions. Examples of resources are: tone detection, tone transmission, loopbacks, voice detection, voice messaging, echo cancellation, compression, or and encryption. Resource device 1070 includes a processor to interpret the tones and communicate with other devices. Resource device 1070 communicates with signaling converter 1062 over link 1052. One skilled in the art will recognize other features for resource device 1070, such as interdigit timing and various other timing functions. In this way, multiplexer 1050 does not require all digital signal processing apparatus, but connects DS0s to resource device 1070 using connection 1072. Connection 1072 is typically a T1 connection although other connections would suffice. Resource device 1070 is capable of exchanging control instructions over link 1052.

Figure 11:
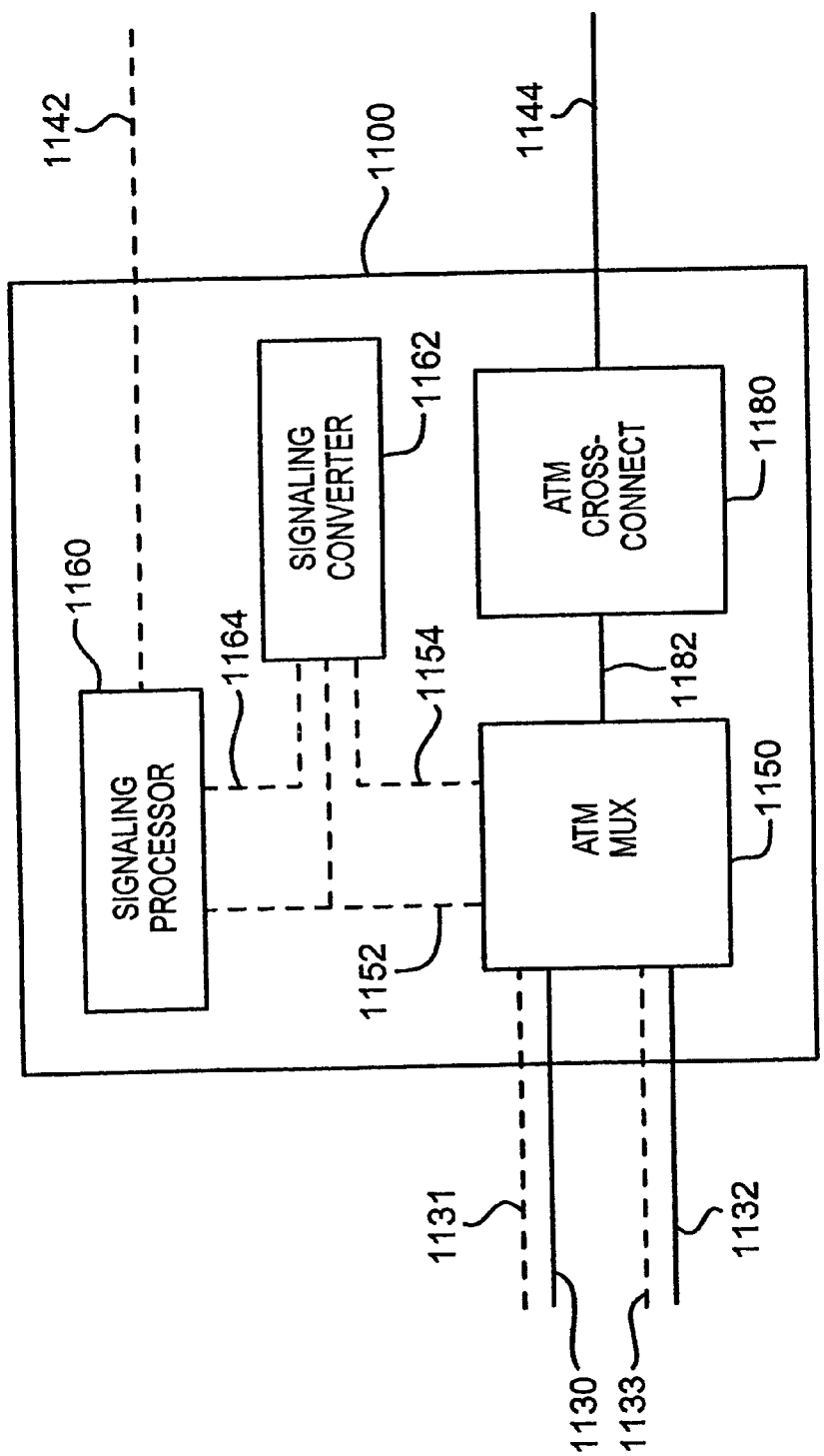
FIG. 11 is a block diagram of a version of the invention.

FIG. 11 depicts broadband system interface 1100 that is comprised of mux 1150, signaling processor 1160, signaling converter 1162, and links 1152, 1154, and 1164. Also shown are connections 1130, 1132, and 1144; and links 1131, 1133, and 1142. These components are configured and operate as described above for the corresponding reference numbers of FIG. 3, except that ATM cross-connect 1180 and connection 1182 have been added. ATM cross-connect 1180 is a conventional ATM cross-connect, such as an NEC model 20. ATM cross-connect 1180 provides a plurality of pre-provisioned VPI/VCI connections for mux 1150 over connection 1182. Connection 1182 is an ATM connection. These VPI/VCIs could be pre-provisioned through ATM cross-connect 1180 to a plurality of devices. Example include switches, servers, enhanced platforms, customer premises equipment, and other muxes. The VPI/VCIs could terminate in other networks. The addition of cross-connect 1180 demonstrates how the selection of VPI/VCIs by the signaling processor on a call-by-call basis allows broadband system interface 1100 to route calls to selected destinations over selected broadband connections.

This is accomplished without the need for an ATM switch. This provides a distinct advantage over current ATM switch based systems in terms of cost and control. ATM switches are typically very expensive and control over the switch is relegated to the switch supplier. In the invention, the signaling processor exerts the control, and the signaling processor does not need to be obtained from an ATM switch supplier.

The ATM Interworking Multiplexer

Figure 12:
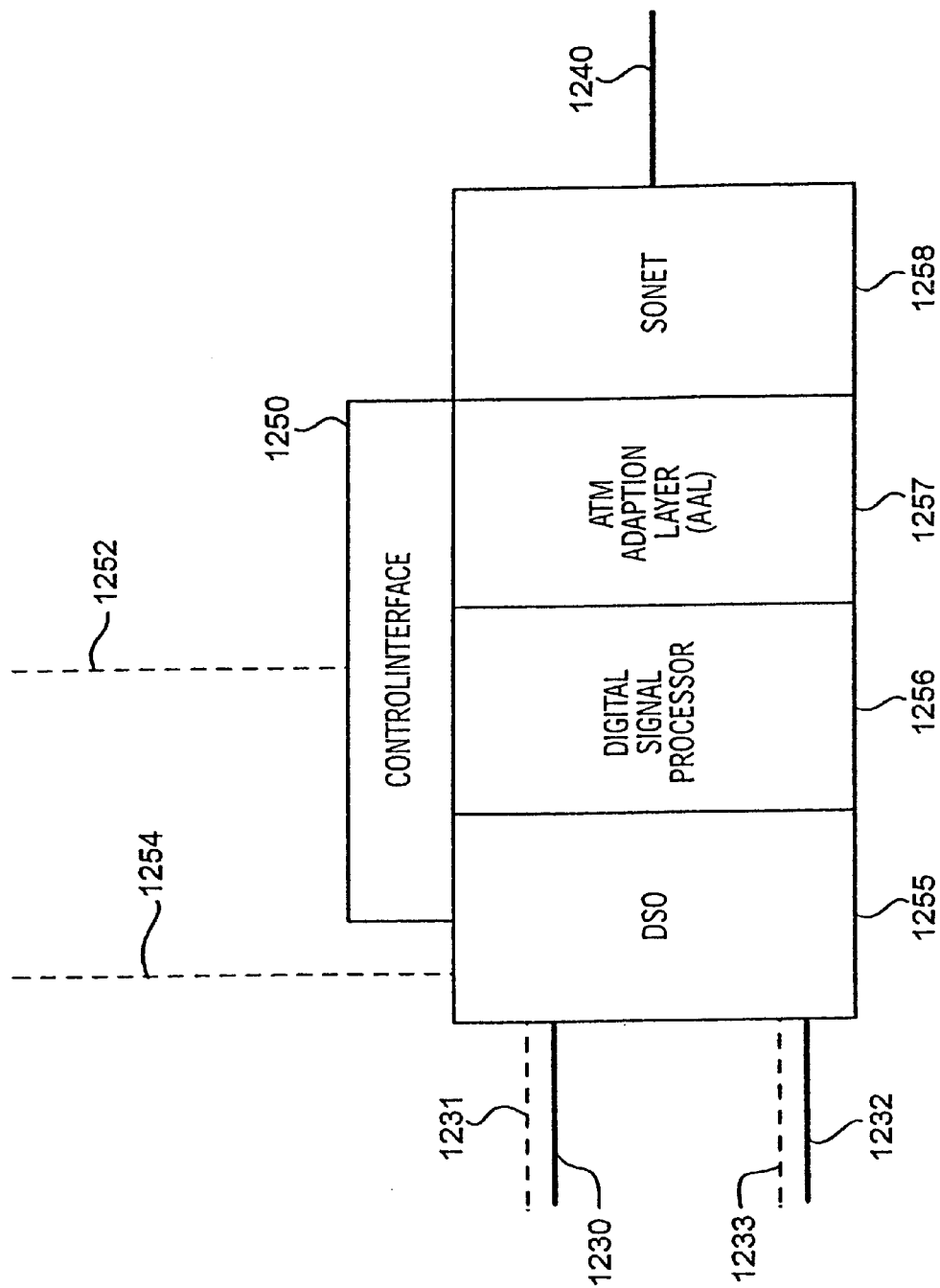
FIG. 12 is a block diagram of a version of the invention.

FIG. 12 shows one embodiment of the mux that is suitable for the present invention, but other muxes that support the requirements of the invention are also applicable. Shown are control interface 1250, DS0 interface 1255, digital signal processor 1256, ATM adaption layer (AAL) 1257, and SONET interface 1258. SONET interface 1258 accepts ATM cells from AAL 1257 and transmits them over connection 1240. Connection 1240 is a SONET connection, such as an OC-3 connection. Control interface 1250 exchanges control messages between the signaling processor, the signaling converter, and the elements of the mux.

DS0 interface 1255 accepts GR-303 formatted signals over connections 1230 and 1232; and links 1231 and 1233. DS0 interface 1255 is operational to cross-connect particular DS0s to other particular DS0s in response to control instructions. DS0 interface 1255 cross-connects the signaling channel DS0s of links 1231 and 1233 to the signaling channel DS0s of link 1254 to the signaling converter. The bearer channel DS0s are coupled to digital signal processor 1256 or AAL 1257 in response to control instructions. In some embodiments, DS0 interface 1255 can also monitor ABCD bits from hybrid GR-303 connections and provide this information to control interface 1250 for transfer to the signaling converter. DS0 interface 1255 provides reciprocal processing in the reverse direction as well. For example, GR-303 signaling messages from the signaling converter received over link 1254 are sent to the remote digital interface along with DS0 from either AAL 1257 or digital signal processor 1256.

DS0 interface 1255 receives the DS0s and handles them in accord with signaling processor instructions received through control interface 1250. This would include interconnecting particular DS0s to other DS0s on particular calls. It would also include connecting particular DS0s to particular functions of digital signal processor 1256 or AAL 1257.

Digital signal processor 1256 is operational to apply various digital processes to particular DS0s in response to control instructions received through control interface 1250. Examples of digital processing include: tone detection, tone transmission, loopbacks, voice detection, voice messaging, echo cancellation, compression, and encryption. For example, the signaling processor may instruct the mux to collect a DTMF dialed number, and then to apply echo cancellation to the DS0 prior to conversion to ATM.

Digital signal processor 1256 is connected to AAL 1257. As discussed, DS0s from DS0 interface 1255 may bypass digital signal processor 1256 and be directly coupled to AAL 1257. AAL 1257 comprises both a convergence sublayer and a segmentation and reassembly (SAR) layer. AAL 1257 is operational to accept the DS0 format and convert the DS0 information into ATM cells. AALs are known in the art and information about AALs is provided by International Telecommunications Union (ITU) document 1.363. An AAL for voice is also described in U.S. Pat. No. 5,606,553, which is hereby incorporated by reference into this application. AAL 1257 obtains the virtual path identifier (VPI) and virtual channel identifier (VCI) for each call from control interface 1250. AAL 1257 also obtains the identity of the DS0 for each call (or the DS0s for an N×64 call). Control interface 1250 receives these instructions from the signaling processor. AAL 1257 then converts user information between the identified DS0 and the identified ATM virtual connection. Acknowledgments that the assignments have been implemented may be sent back to the signaling processor if desired. Calls with a bit rate that are a multiple of 64 kbit/second are known as N×64 calls. If desired, AAL 1257 can be capable of accepting control messages through control interface 1250 for N×64 calls. The signaling processor would instruct AAL 1257 to group the DS0s for the call.

As discussed above, the mux also handles calls in the opposite direction—from SONET interface 1258 to DS0 interface 1255. For this communications, the VPI/VCI has typically been selected and the communications routed through the cross-connect. As a result, AAL 1257 needs only to identify the DS0 for that particular VPI/VCI. The signaling processor could provide this assignment through control interface 1250 to AAL 1257. A technique for processing VPI/VCIs is disclosed in U.S. Pat. No. 5,940,393, which is hereby incorporated by reference into this application.

DS0 connections are bi-directional and ATM connections are typically uni-directional. As a result, two virtual connections in opposing directions will typically be required for each DS0. Those skilled in the art will appreciate how this can be accomplished in the context of the invention. For example, the broadband system could be provisioned with a second set of VPI/VCIs in the opposite direction as the original set of VPI/VCIs. On each call, the mux would be configured to automatically invoke this second VPI/VCI to provide a bi-directional virtual connection to match the bi-directional DS0 on the call.

The Signaling Processor

The signaling processor is referred to as a call/connection manager (CCM), and it receives and processes telecommunications call signaling and control messages to select connections that establish communication paths for calls. In the preferred embodiment, the CCM processes SS7 signaling to select connections for a call. CCM processing is described in U.S. Pat. No. 6,031,840, which is incorporated herein by reference.

In addition to selecting connections, the CCM performs many other functions in the context of call processing. It not only can control routing and select the actual connections, but it can also validate callers, control echo cancelers, generate billing information, invoke intelligent network functions, access remote databases, manage traffic, and balance network loads. One skilled in the art will appreciate how the CCM described below can be adapted to operate in the above embodiments.

Figure 13:
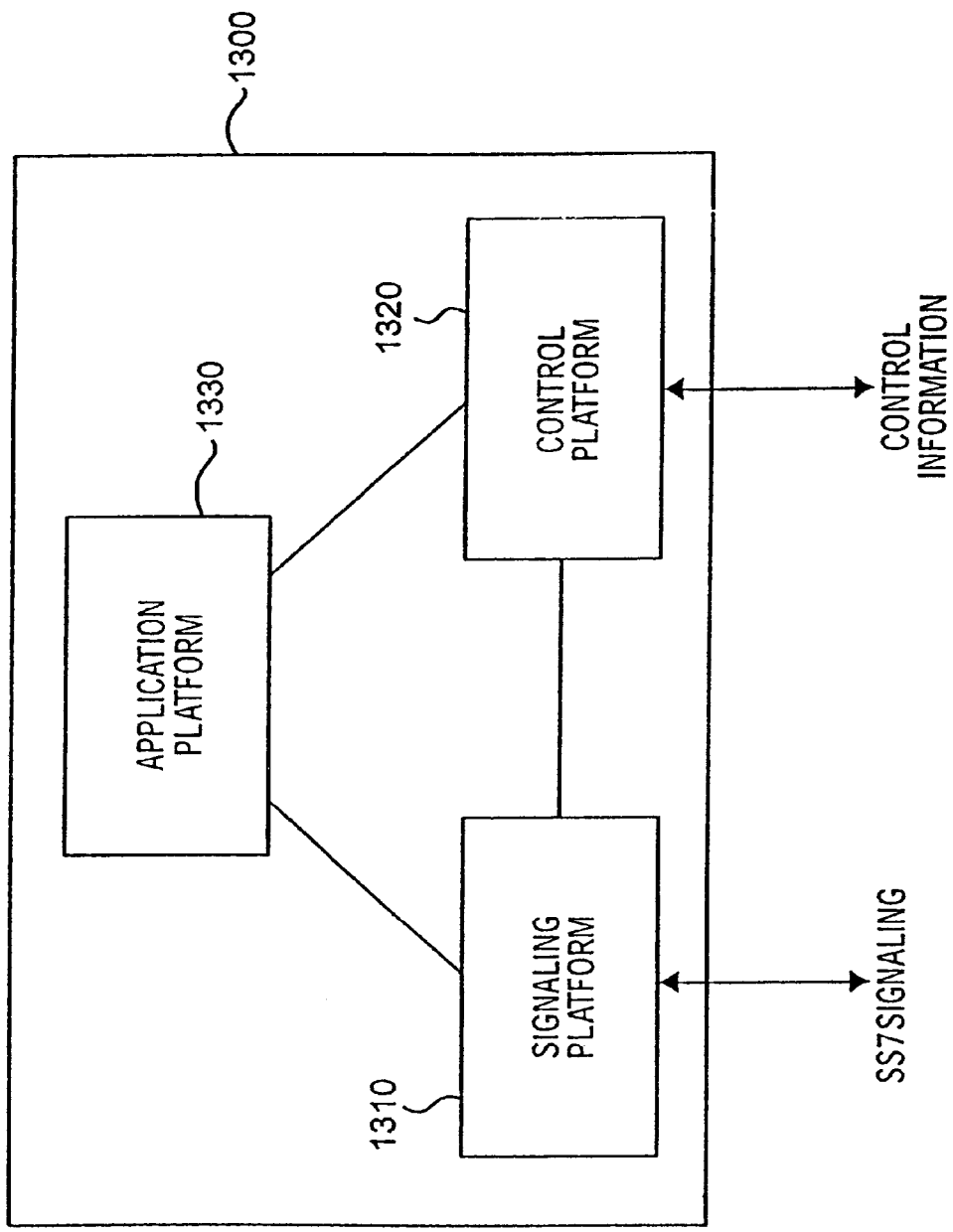
FIG. 13 is a block diagram of a version of the present invention.

FIG. 13 depicts a version of the CCM. Other versions are also contemplated. In the embodiment of FIG. 13, CCM 1300 controls an ATM interworking multiplexer (mux) that performs interworking of DS0s and VPI/VCIs. However, the CCM may control other communications devices and connections in other embodiments.

CCM 1300 comprises signaling platform 1310, control platform 1320, and application platform 1330. Each of the platforms 1310, 1320, and 1330 is coupled to the other platforms.

Signaling platform 1310 is externally coupled to the SS7 systems—in particular to systems having a message transfer part (MTP), an ISDN user part (ISUP), a signaling connection control part (SCCP), an intelligent network application part (INAP), and a transaction capabilities application part (TCAP). Control platform 1320 is externally coupled to a mux control, an echo control, a resource control, billing, and operations.

Signaling platform 1310 comprises MTP levels 1–3, ISUP, TCAP, SCCP, and INAP functionality and is operational to transmit and receive the SS7 messages. The ISUP, SCCP, INAP, and TCAP functionality use MTP to transmit and receive the SS7 messages. Together, this functionality is referred as an "SS7 stack," and it is well known. The software required by one skilled in the art to configure an SS7 stack is commercially available, for example, from the Trillium company.

Control platform 1320 is comprised of various external interfaces including a mux interface, an echo interface, a resource control interface, a billing interface, and an operations interface. The mux interface exchanges messages with at least one mux. These messages comprise DS0 to VPI/VCI assignments, acknowledgments, and status information. The echo control interface exchanges messages with echo control systems. Messages exchanged with echo control systems might include instructions to enable or disable echo cancellation on particular DS0s, acknowledgments, and status information.

The resource control interface exchanges messages with external resources. Examples of such resources are devices that implement continuity testing, encryption, compression, tone detection/transmission, voice detection, and voice messaging. The messages exchanged with resources are instructions to apply the resource to particular DS0s, acknowledgments, and status information. For example, a message may instruct a continuity testing resource to provide a loopback or to send and detect a tone for a continuity test.

The billing interface transfers pertinent billing information to a billing system. Typical billing information includes the parties to the call, time points for the call, and any special features applied to the call. The operations interface allows for the configuration and control of CCM 1300. One skilled in the art will appreciate how to produce the software for the interfaces in control platform 1320.

Application platform 1330 is functional to process signaling information from signaling platform 1310 in order to select connections. The identity of the selected connections are provided to control platform 1320 for the mux interface. Application platform 1330 is responsible for validation, translation, routing, call control, exceptions, screening, and error handling. In addition to providing the control requirements for the mux, application platform 1330 also provides requirements for echo control and resource control to the appropriate interface of control platform 1320. In addition, application platform 1330 generates signaling information for transmission by signaling platform 1310. The signaling information might be ISUP, INAP, or TCAP messages to external network elements. Pertinent information for each call is stored in a call control block (CCB) for the call. The CCB can be used for tracking and billing the call.

Application platform 1330 operates in general accord with the Basic Call Model (BCM) defined by the ITU. An instance of the BCM is created to handle each call. The BCM includes an originating process and a terminating process. Application platform 1330 includes a service switching function (SSF) that is used to invoke the service control function (SCF). Typically, the SCF is contained in a service control point (SCP). The SCF is queried with TCAP or INAP messages. The originating or terminating processes will access remote databases with intelligent network (IN) functionality via the SSF function.

Software requirements for application platform 1330 can be produced in specification and description language (SDL) defined in ITU-T Z.100. The SDL can be converted into C code. Additional C and C++ code can be added as required to establish the environment.

CCM 1300 can be comprised of the above-described software loaded onto a computer. The computer can be an Integrated Micro Products (IMP) FT-Sparc 600 using the Solaris operating system and conventional database systems. It may be desirable to utilize the multi-threading capability of a Unix operating system.

From FIG. 13, it can be seen that application platform 1330 processes signaling information to control numerous systems and facilitate call connections and services. The SS7 signaling is exchanged with external components through signaling platform 1310, and control information is exchanged with external systems through control platform 1320. Advantageously, CCM 1300 is not integrated into a switch CPU that is coupled to a switching matrix. Unlike an SCP, CCM 1300 is capable of processing ISUP messages independently of TCAP queries.

SS7 Message Designations

SS7 messages are well known. Designations for various SS7 messages commonly are used. Those skilled in the art are familiar with the following message designations:

ACM—Address Complete Message
ANM—Answer Message
BLO—Blocking
BLA—Blocking Acknowledgment
CPG—Call Progress
CRG—Charge Information
CGB—Circuit Group Blocking
CGBA—Circuit Group Blocking Acknowledgment
GRS—Circuit Group Reset
GRA—Circuit Group Reset Acknowledgment
CGU—Circuit Group Unblocking
CGUA—Circuit Group Unblocking Acknowledgment
CQM—Circuit Group Query
CQR—Circuit Group Query Response
CRM—Circuit Reservation Message
CRA—Circuit Reservation Acknowledgment
CVT—Circuit Validation Test
CVR—Circuit Validation Response
CFN—Confusion
COT—Continuity
CCR—Continuity Check Request
EXM—Exit Message
INF—Information
INR—Information Request
IAM—Initial Address
LPA—Loop Back Acknowledgment
PAM—Pass Along
REL—Release
RLC—Release Complete
RSC—Reset Circuit
RES—Resume
SUS—Suspend
UBL—Unblocking
UBA—Unblocking Acknowledgment
UCIC—Unequipped Circuit Identification Code.

CCM Tables

Call processing typically entails two aspects. First, an incoming or "originating" connection is recognized by an originating call process. For example, the initial connection that a call uses to enter a network is the originating connection in that network. Second, an outgoing or "terminating" connection is selected by a terminating call process. For example, the terminating connection is coupled to the originating connection in order to extend the call through the network. These two aspects of call processing are referred to as the originating side of the call and the terminating side of the call.

Figure 14:
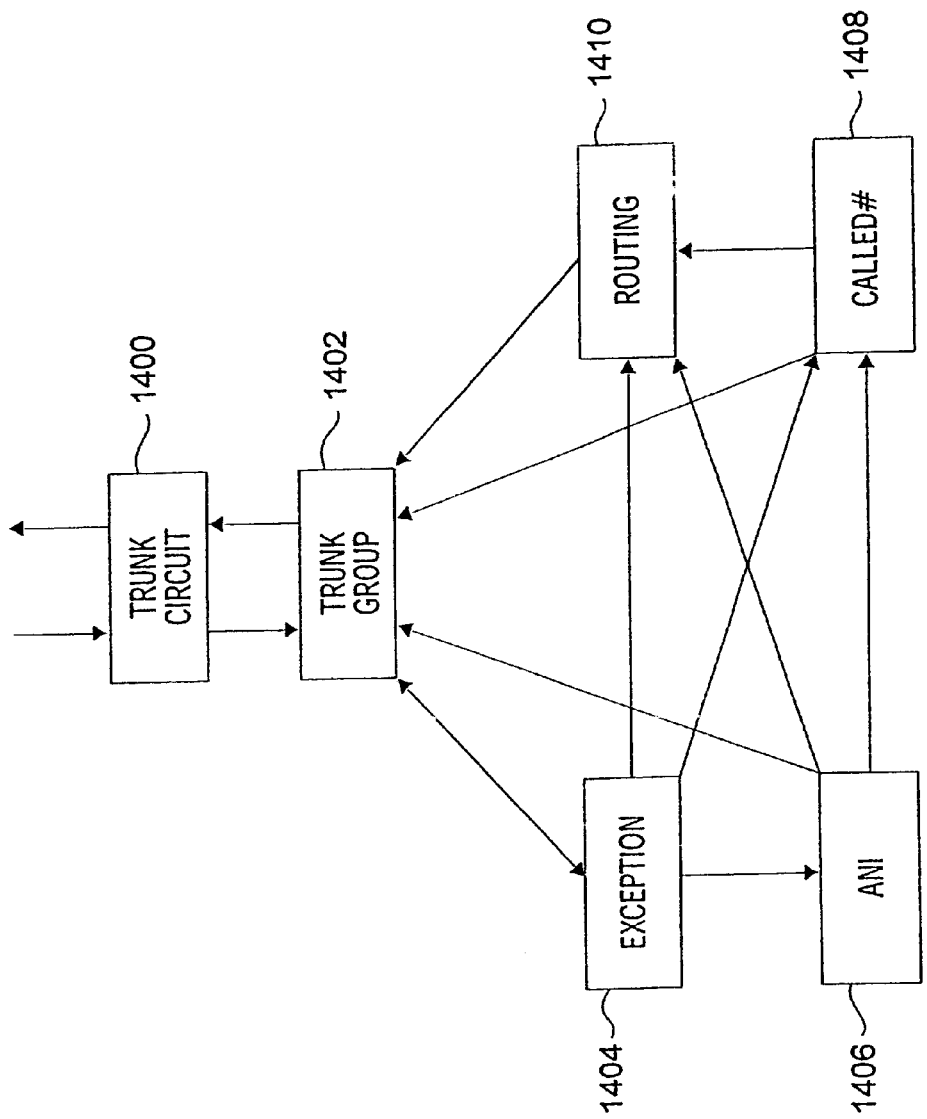
FIG. 14 is a logic diagram of a version of the present invention.

FIG. 14 depicts a data structure used by application platform 1330 to execute the BCM. This is accomplished through a series of tables that point to one another in various ways. The pointers are typically comprised of next function and next index designations. The next function points to the next table, and the next index points to an entry or a range of entries in that table. The data structure has trunk circuit table 1400, trunk group table 1402, exception table 1404, ANI table 1406, called number table 1408, and routing table 1410.

Trunk circuit table 1400 contains information related to the connections. Typically, the connections are DS0 or ATM connections. Initially, trunk circuit table 1400 is used to retrieve information about the originating connection. Later, the table is used to retrieve information about the terminating connection. When the originating connection is being processed, the trunk group number in trunk circuit table 1400 points to the applicable trunk group for the originating connection in trunk group table 1402.

Trunk group table 1402 contains information related to the originating and terminating trunk groups. When the originating connection is being processed, trunk group table 1402 provides information relevant to the trunk group for the originating connection and typically points to exception table 1404.

Exception table 1404 is used to identify various exception conditions related to the call that may influence the routing or other handling of the call. Typically, exception table 1404 points to ANI table 1406. Although, exception table 1404 may point directly to trunk group table 1402, called number table 1408, or routing table 1410.

ANI table 1406 is used to identify any special characteristics related to the caller's number. The caller's number is commonly known as automatic number identification (ANI). ANI table 1406 typically points to called number table 1408. Although, ANI table 1406 may point directly to trunk group table 1402 or routing table 1410.

Called number table 1408 is used to identify routing requirements based on the called number. This will be the case for standard telephone calls. Called number table 1408 typically points to routing table 1410. Although, it may point to trunk group table 1402.

Routing table 1410 has information relating to the routing of the call for the various connections. Routing table 1410 is entered from a pointer in either exception table 1404, ANI table 1406, or called number table 1408. Routing table 1410 typically points to a trunk group in trunk group table 1402.

When exception table 1404, ANI table 1406, called number table 1408, or routing table 1410 point to trunk group table 1402, they effectively select the terminating trunk group. When the terminating connection is being processed, the trunk group number in trunk group table 1402 points to the trunk group that contains the applicable terminating connection in trunk circuit table 1402.

The terminating trunk circuit is used to extend the call. The trunk circuit is typically a VPI/VCI or a DS0. Thus it can be seen that by migrating through the tables, a terminating connection can be selected for a call.

Figure 15:
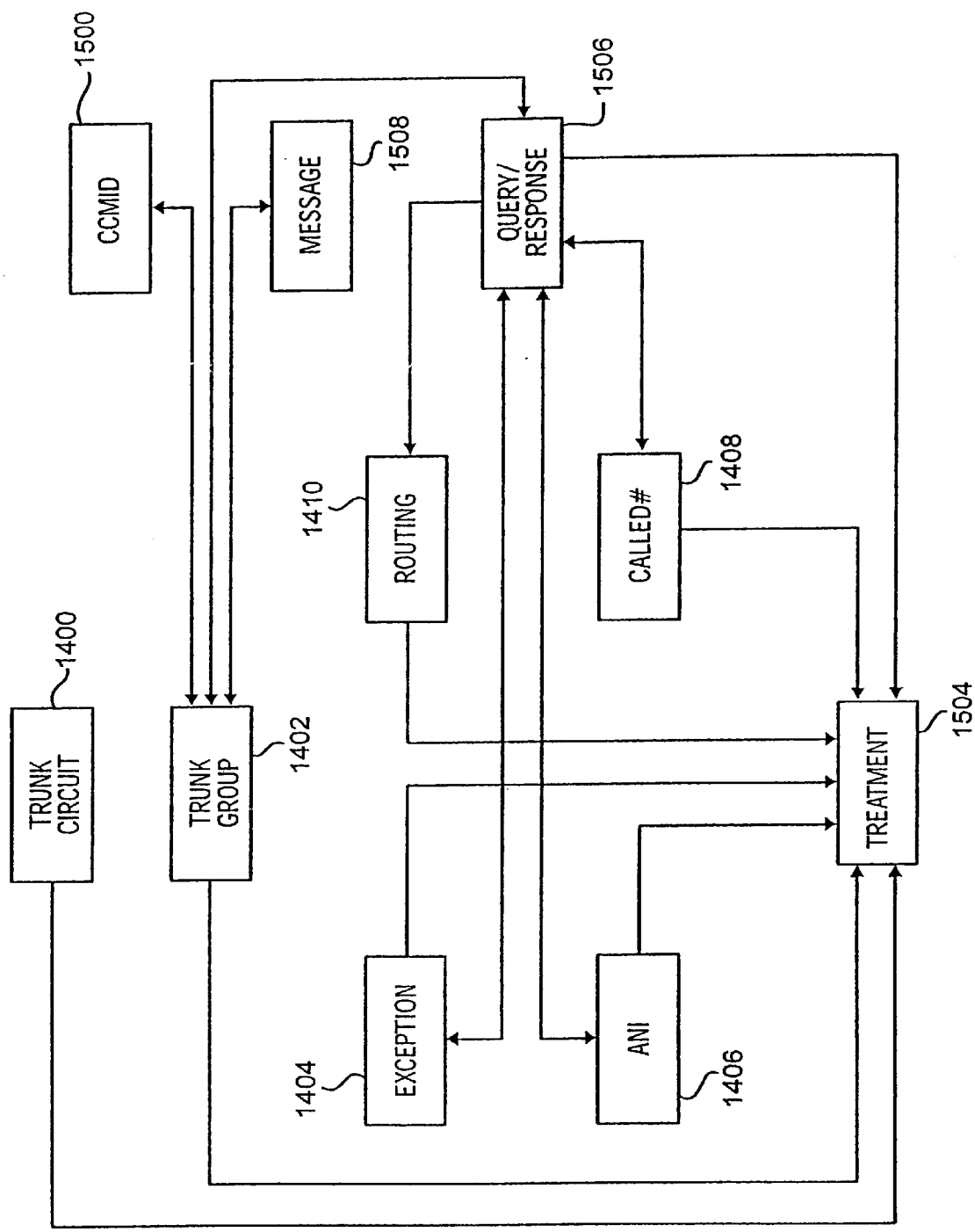
FIG. 15 is a logic diagram of a version of the present invention.

FIG. 15 is an overlay of FIG. 14. The tables from FIG. 14 are present, but for clarity, their pointers have been omitted. FIG. 15 illustrates additional tables that can be accessed from the tables of FIG. 14. These include CCM ID table 1500, treatment table 1504, query/response table 1506, and message table 1508.

CCM ID table 1500 contains various CCM SS7 point codes. It can be accessed from trunk group table 1402, and it points back to trunk group table 1402.

Treatment table 1504 identifies various special actions to be taken in the course of call processing. This will typically result in the transmission of a release message (REL) and a cause value. Treatment table 1504 can be accessed from trunk circuit table 1400, trunk group table 1402, exception table 1404, ANI table 1406, called number table 1408, routing table 1410, and query/response table 1506.

Query/response table 1506 has information used to invoke the SCF. It can be accessed by trunk group table 1402, exception table 1404, ANI table 1406, called number table 1408, and routing table 1410. It points to trunk group table 1402, exception table 1404, ANI table 1406, called number table 1408, routing table 1410, and treatment table 1504.

Message table 1508 is used to provide instructions for messages from the termination side of the call. It can be accessed by trunk group table 1402 and points to trunk group table 1402.

FIGS. 16–23 depict examples of the various tables described above. FIG. 16 depicts an example of the trunk circuit table. Initially, the trunk circuit table is used to access information about the originating circuit. Later in the processing, it is used to provide information about the terminating circuit. For originating circuit processing, the associated point code is used to enter the table. This is the point code of the switch or CCM associated with the originating circuit. For terminating circuit processing, the trunk group number is used to enter the table.

The table also contains the circuit identification code (CIC). The CIC identifies the circuit which is typically a DS0 or a VPI/VCI. Thus, the invention is capable of mapping the SS7 CICs to the ATM VPI/VCI. If the circuit is ATM, the virtual path (VP) and the virtual channel (VC) also can be used for identification. The group member number is a numeric code that is used for terminating circuit selection. The hardware identifier identifies the location of the hardware associated with the originating circuit. The echo canceler (EC) identification (ID) entry identifies the echo canceler for the originating circuit.

The remaining fields are dynamic in that they are filled during call processing. The echo control entry is filled based on three fields in signaling messages: the echo suppresser indicator in the IAM or CRM, the echo control device indicator in the ACM or CPM, and the information transfer capability in the IAM. This information is used to determine if echo control is required on the call. The satellite indicator is filled with the satellite indicator in the IAM or CRM. It may be used to reject a call if too many satellites are used. The circuit status indicates if the given circuit is idle, blocked, or not blocked. The circuit state indicates the current state of the circuit, for example, active or transient. The time/date indicates when the idle circuit went idle.

FIG. 17 depicts an example of the trunk group table. During origination processing, the trunk group number from the trunk circuit table is used to key into the trunk table. Glare resolution indicates how a glare situation is to be resolved. Glare is dual seizure of the same circuit. If the glare resolution entry is set to "even/odd," the network element with the higher point code controls the even circuits, and the network element with the lower point code controls the odd circuits. If the glare resolution entry is set to "all," the CCM controls all of the circuits. If the glare resolution entry is set to "none," the CCM yields. The continuity control entry lists the percent of calls requiring continuity tests on the trunk group.

The common language location identifier (CLLI) entry is a Bellcore standardized entry. The satellite trunk group entry indicates that the trunk group uses a satellite. The satellite trunk group entry is used in conjunction with the satellite indicator field described above to determine if the call has used too many satellite connections and, therefore, must be rejected. The service indicator indicates if the incoming message is from a CCM (ATM) or a switch (TDM). The outgoing message index (OMI) points to the message table so that outgoing messages can obtain parameters. The associated number plan area (NPA) entry identifies the area code.

Selection sequence indicates the methodology that will be used to select a connection. The selection sequence field designations tell the trunk group to select circuits based on the following: least idle, most idle, ascending, descending, clockwise, and counterclockwise. The hop counter is decremented from the IAM. If the hop counter is zero, the call is released. Automatic congestion control (ACC) active indicates whether or not congestion control is active. If automatic congestion control is active, the CCM may release the call. During termination processing, the next function and index are used to enter the trunk circuit table.

FIG. 18 depicts an example of the exception table. The index is used as a pointer to enter the table. The carrier selection identification (ID) parameter indicates how the caller reached the network and is used for routing certain types of calls. The following are used for this field: spare or no indication, selected carrier identification code presubscribed and input by the calling party, selected carrier identification code presubscribed and not input by the calling party, selected carrier identification code presubscribed and no indication of input by the calling party, and selected carrier identification code not presubscribed and input by the calling party. The carrier identification (ID) indicates the network that the caller wants to use. This is used to route calls directly to the desired network. The called party number nature of address differentiates between 0+ calls, 1+ calls, test calls, and international calls. For example, international calls might be routed to a pre-selected international carrier.

The called party "digits from" and "digits to" focus further processing unique to a defined range of called numbers. The "digits from" field is a decimal number ranging from 1–15 digits. It can be any length and, if filled with less than 15 digits, is filled with Os for the remaining digits. The "digits to" field is a decimal number ranging from 1–15 digits. It can be any length and, if filled with less than 15 digits, is filled with 9s for the remaining digits. The next function and next index entries point to the next table which is typically the ANI table.

FIG. 19 depicts an example of the ANI table. The index is used to enter the table. The calling party category differentiates among types of calling parties, for example, test calls, emergency calls, and ordinary calls. The calling party\charge number entry nature of address indicates how the ANI is to be obtained. The following is the table fill that is used in this field: unknown, unique subscriber numbers, ANI not available or not provided, unique national number, ANI of the called party included, ANI of the called party not included, ANI of the called party includes national number, non-unique subscriber number, non-unique national number, non-unique international number, test line test code, and all other parameter values.

The "digits from" and "digits to" focus further processing unique to ANI within a given range. The data entry indicates if the ANI represents a data device that does not need echo control. Originating line information (OLI) differentiates among ordinary subscriber, multiparty line, ANI failure, station level rating, special operator handling, automatic identified outward dialing, coin or non-coin call using database access, 800/888 service call, coin, prison/inmate service, intercept (blank, trouble, and regular), operator handled call, outward wide area telecommunications service, telecommunications relay service (TRS), cellular services, private paystation, and access for private virtual network types of service. The next function and next index point to the next table which is typically the called number table.

FIG. 20 depicts an example of the called number table. The index is used to make enter the table. The called number nature of address entry indicates the type of dialed number, for example, national versus international. The "digits from" and "digits to" entries focus further processing unique to a range of called numbers. The processing follows the processing logic of the "digits from" and "digits to" fields in FIG. 18. The next function and next index point to the next table which is typically the routing table.

FIG. 21 depicts an example of the routing table. The index is used to enter the table. The transit network selection (TNS) network identification (ID) plan indicates the number of digits to use for the CIC. The transit network selection "digits from" and "digits to" fields define the range of numbers to identify an international carrier. The circuit code indicates the need for an operator on the call. The next function and next index entries in the routing table are used to identify a trunk group. The second and third next function/index entries define alternate routes. The third next function entry can also point back to another set of next functions in the routing table in order to expand the number of alternate route choices. The only other entries allowed are pointers to the treatment table. If the routing table points to the trunk group table, then the trunk group table typically points to a trunk circuit in the trunk circuit table. The yield from the trunk circuit table is the terminating connection for the call.

It can be seen from FIGS. 16–21 that the tables can be configured and relate to one another in such a way that call processes can enter the trunk circuit table for the originating connection and can traverse through the tables by keying on information and using pointers. The yield of the tables is typically a terminating connection identified by the trunk circuit table. In some cases, treatment is specified by the treatment table instead of a connection. If, at any point during the processing, a trunk group can be selected, processing may proceed directly to the trunk group table for terminating circuit selection. For example, it may be desirable to route calls from a particular ANI over a particular set of trunk groups. In this case, the ANI table would point directly to the trunk group table, and the trunk group table would point to the trunk circuit table for a terminating circuit. The default path through the tables is: trunk circuit, trunk group, exception, ANI, called number, routing, trunk group, and trunk circuit.

FIG. 22 depicts an example of the treatment table. Either the index or the message received cause number are filled and are used to enter the table. If the index is filled and used to enter the table, the general location, coding standard, and cause value indicator are used to generate an SS7 REL. The message received cause value entry is the cause value in a received SS7 message. If the message received cause value is filled and used to enter the table, then the cause value from that message is used in a REL from the CCM. The next function and next index point to the next table.

FIG. 23 depicts an example of the message table. This table allows the CCM to alter information in outgoing messages. Message type is used to enter the table, and it represents the outgoing standard SS7 message type. The parameter is the pertinent parameter within the outgoing SS7 message. The indexes point to various entries in the trunk group table and determine if parameters can be unchanged, omitted, or modified in the outgoing messages.

Those skilled in the art will appreciate that variations from the specific embodiments disclosed above are contemplated by the invention. The invention should not be restricted to the above embodiments, but should be measured by the following claims.

We claim:

1. A broadband system interface configured to communicate with a remote terminal and a broadband network, the broadband system interface comprising:

a signaling interface configured to receive first signaling having a first format from the remote terminal, process the first signaling to generate second signaling having a second format, and transmit the second signaling;

a signaling processor configured to receive the second signaling from the signaling interface, process the second signaling to select a connection in the broadband network, generate a control message that includes an identifier indicating the selected connection, and transmit the control message; and a bearer interface configured to receive digital user communications from the remote terminal, receive the control message from the signaling processor, and interwork the digital user communications on the selected connection by adding the identifier to the digital user communications.

2. The broadband system interface of claim 1 further comprising:

a routing system configured to route the digital user communications with the identifier to the broadband network based on the identifier.

3. The broadband system interface of claim 1 wherein the bearer interface comprises a multiplexer.

4. The broadband system interface of claim 1 wherein the bearer interface is configured to receive the digital user communications in a GR-303 format.

5. The broadband system interface of claim 1 wherein the selected connection comprises an Asynchronous Transfer Mode (ATM) connection and the identifier comprises an ATM identifier.

6. The broadband system interface of claim 1 wherein the first format of the first signaling comprises GR-303 format.

7. The broadband system interface of claim 6 wherein the second format of the second signaling comprises SS7 signaling.

8. The broadband system interface of claim 1 wherein the signaling processor is configured to:

receive an initial address message; and process the initial address message to select the connection.

9. The broadband system interface of claim 1 wherein the signaling processor is configured to:

receive a release message; and transmit a tear down message to the bearer interface responsive to the release message.

10. The broadband system interface of claim 1 wherein the signaling processor is configured to transmit third signaling to the broadband network.

11. A method of operating a broadband system interface comprised of a signaling interface, a signaling processor, and a bearer interface, the broadband system interface configured to communicate with a remote terminal and a broadband network, the method comprising:

in the signaling interface, receiving first signaling having a first format from the remote terminal, processing the first signaling to generate second signaling having a second format, and transmitting the second signaling;

in the signaling processor, receiving the second signaling from the signaling interface, processing the second signaling to select a connection in the broadband network, generating a control message that includes an identifier indicating the selected connection, and transmitting the control message; and in the bearer interface, receiving digital user communications from the remote terminal, receiving the control message from the signaling processor, and interworking the digital user communications on the selected connection by adding the identifier to the digital user communications.

12. The method of claim 11 further comprising:

routing the digital user communications with the identifier to the broadband network based on the identifier.

13. The method of claim 11 wherein the bearer interface comprises a multiplexer.

14. The method of claim 11 further comprising:

in the bearer interface, receiving the digital user communications in a GR-303 format.

15. The method of claim 11 wherein the selected connection comprises an Asynchronous Transfer Mode (ATM) connection and the identifier comprises an ATM identifier.

16. The method of claim 11 wherein the first format of the first signaling comprises GR-303 format.

17. The method of claim 16 wherein the second format of the second signaling comprises SS7 signaling.

18. The method of claim 11 further comprising:

in the signaling processor, receiving an initial address message and processing the initial address message to select the connection.

19. The method of claim 11 further comprising:

in the signaling processor, receiving a release message and transmitting a tear down message to the bearer interface responsive to the release message.

20. The method of claim 11 further comprising transmitting third signaling to the broadband network.

* * * * *